United States Patent
Haag et al.

(10) Patent No.: US 12,130,455 B2
(45) Date of Patent: Oct. 29, 2024

(54) MULTILAYER PARTIAL MIRROR, BACKLIGHT, AND DISPLAY SYSTEM

(71) Applicant: 3M INNOVATIVE PROPERTIES COMPANY, St. Paul, MN (US)

(72) Inventors: Adam D. Haag, Woodbury, MN (US); Gilles J. Benoit, Minneapolis, MN (US); Stephen A. Johnson, Woodbury, MN (US); Samuel A. Minno, St. Paul, MN (US); Quinn D. Sanford, Mosinee, WI (US); Lin Zhao, Woodbury, MN (US); Robert D. Taylor, Stacy, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 18/569,302

(22) PCT Filed: Jun. 28, 2022

(86) PCT No.: PCT/IB2022/056006
§ 371 (c)(1),
(2) Date: Dec. 12, 2023

(87) PCT Pub. No.: WO2023/281357
PCT Pub. Date: Jan. 12, 2023

(65) Prior Publication Data
US 2024/0264339 A1 Aug. 8, 2024

Related U.S. Application Data

(60) Provisional application No. 63/203,068, filed on Jul. 7, 2021.

(51) Int. Cl.
*G02B 5/08* (2006.01)
*F21V 8/00* (2006.01)
(Continued)

(52) U.S. Cl.
CPC .......... *G02B 5/0841* (2013.01); *G02B 5/305* (2013.01); *G02B 5/3066* (2013.01);
(Continued)

(58) Field of Classification Search
CPC .... G02B 5/0841; G02B 5/305; G02B 5/3066; G02B 5/3083; G02B 6/0055; G02B 27/281; G02F 1/133605
(Continued)

(56) References Cited

U.S. PATENT DOCUMENTS 3,610,729 A 10/1971 Rogers
4,446,305 A 5/1984 Rogers et al.
(Continued)

FOREIGN PATENT DOCUMENTS

WO 1995017303 A1 6/1995
WO 1999039224 A1 8/1999
(Continued)

OTHER PUBLICATIONS

International Search Report for PCT International Application No. PCT/IB2022/056006, mailed on Sep. 29, 2022, 3 pages.
(Continued)

*Primary Examiner* — Ricky D Shafer
(74) *Attorney, Agent, or Firm* — Clifton F. Richardson

(57) ABSTRACT

A multilayer partial mirror includes a plurality of alternating first a second polymeric layers numbering at least 50 in total, disposed between, and integrally formed with, opposing first and second polymeric skin layers. For a visible wavelength range extending from about 420 nm to about 680 nm and an incident light propagating in an incident plane that includes a x-direction, and for an s-polarized incident light, the multilayer partial mirror has an average reflectance Rs1 for a first incident angle of less than about 10 degrees, and an average reflectance Rs2 for a second incident angle of
(Continued)

greater than about 45 degrees, and for a p-polarized incident light, the multilayer partial mirror has an average reflectance Rp1 for the first incident angle, and an average reflectance Rp2 for the second incident angle. Each of Rs2/Rs1 and Rp2/Rp1 is greater than about 1.15.

17 Claims, 23 Drawing Sheets

(51) Int. Cl.
    *G02B 5/30*     (2006.01)
    *G02B 27/28*     (2006.01)
    *G02F 1/13357*     (2006.01)

(52) U.S. Cl.
    CPC ......... *G02B 5/3083* (2013.01); *G02B 6/0055* (2013.01); *G02B 27/281* (2013.01); *G02F 1/133605* (2013.01)

(58) Field of Classification Search
    USPC .................................................. 359/485.03
    See application file for complete search history.

(56) References Cited

U.S. PATENT DOCUMENTS

| | | | |
|---|---|---|---|
| 4,540,623 A | 9/1985 | Im et al. | |
| 5,103,337 A | 4/1992 | Schrenk et al. | |
| 5,122,906 A * | 6/1992 | Wheatley | G02B 5/0841 359/586 |
| 5,126,880 A * | 6/1992 | Wheatley | B32B 27/06 359/586 |
| 5,262,894 A * | 11/1993 | Wheatley | G02B 5/0883 359/586 |
| 5,339,198 A * | 8/1994 | Wheatly | G02B 5/287 359/359 |
| 5,360,659 A | 11/1994 | Arends et al. | |
| 5,448,404 A | 9/1995 | Schrenk et al. | |
| 5,882,774 A | 3/1999 | Jonza et al. | |
| 6,157,490 A | 12/2000 | Wheatley et al. | |
| 6,179,948 B1 | 1/2001 | Merrill et al. | |
| 6,368,699 B1 | 4/2002 | Gilbert et al. | |
| 6,498,683 B2 * | 12/2002 | Condo | B29C 55/023 359/580 |
| 6,531,230 B1 | 3/2003 | Weber et al. | |
| 6,783,349 B2 | 8/2004 | Neavin et al. | |
| 7,094,461 B2 | 8/2006 | Ruff et al. | |
| 2002/0061393 A1 * | 5/2002 | Jonza | B32B 7/12 428/480 |
| 2003/0165060 A1 * | 9/2003 | Ouderkirk | G02B 27/283 362/297 |
| 2004/0175552 A1 * | 9/2004 | Ouderkirk | G02B 6/005 428/483 |
| 2005/0122587 A1 * | 6/2005 | Ouderkirk | G02B 5/305 359/487.05 |
| 2007/0121034 A1 * | 5/2007 | Ouderkirk | G02F 1/133536 349/96 |
| 2009/0079909 A1 * | 3/2009 | Ouderkirk | G02F 1/133536 349/67 |
| 2011/0170570 A1 | 7/2011 | Singer et al. | |
| 2011/0272849 A1 | 11/2011 | Neavin et al. | |
| 2014/0240829 A1 * | 8/2014 | Weber | G02B 5/287 359/487.04 |
| 2014/0313572 A1 * | 10/2014 | Kivel | G02B 5/0816 359/359 |
| 2019/0250320 A1 | 8/2019 | Johnson et al. | |
| 2020/0183065 A1 | 6/2020 | Haag et al. | |
| 2020/0319389 A1 | 10/2020 | Yun et al. | |

FOREIGN PATENT DOCUMENTS

| | | |
|---|---|---|
| WO | 2020115679 A2 | 6/2020 |
| WO | 2020155158 A1 | 8/2020 |
| WO | 2021224760 A1 | 11/2021 |
| WO | 2021224799 A1 | 11/2021 |

OTHER PUBLICATIONS

Weber, "Giant Birefringent Optics in Multilayer Polymer Mirrors", Science, 2000, vol. 287, pp. 2451-2456.

* cited by examiner

MULTILAYER PARTIAL MIRROR, BACKLIGHT, AND DISPLAY SYSTEM

CROSS REFERENCE TO RELATED APPLICATIONS

This application is a national stage filing under 35 U.S.C. 371 of PCT/IB2022/056006, filed Jun. 28, 2022, which claims the benefit of U.S. Application No. 63/203,068, filed Jul. 7, 2021, the disclosures of which are incorporated by reference in their entireties herein.

TECHNICAL FIELD

The present disclosure relates, in general, to a multilayer partial mirror. In particular, the present disclosure relates to a multilayer partial mirror for a backlight of a display panel.

BACKGROUND

Typically, collimating reflective polarizers are used in display devices to eliminate optical artifacts, such as reflective Moiré. However, such collimating reflective polarizers may decrease an axial luminance of the display devices.

SUMMARY

In a first aspect, the present disclosure provides a multilayer partial mirror. The multilayer partial mirror includes a plurality of alternating first and second polymeric layers numbering at least 50 in total. The plurality of alternating first and second layers are disposed between, and integrally formed with, opposing first and second polymeric skin layers. Each of the first and second polymeric layers has an average thickness of greater than about 0.5 microns. The first and second polymeric layers include respective indices $nx1$ and $nx2$ along a same in-plane x-direction, respective indices $ny1$ and $ny2$ along an in-plane y-direction orthogonal to the x-direction, and respective indices $nz1$ and $nz2$ along a z-direction of the polymeric layers orthogonal to the x- and y-directions. For at least one wavelength in a visible wavelength range extending from about 420 nanometers (nm) to about 680 nm, $nx1$ and $ny1$ are within about 0.05 of each other. For the at least one wavelength in the visible wavelength range, $nz1$ is less than each of $nx1$ and $nx2$ by at least 0.06. For the at least one wavelength in the visible wavelength range, and for each of the first and second polymeric skin layers, corresponding indices of the polymeric skin layer and one of the first polymeric layers and second polymeric layers along each of x-, y-, and z-directions are within about 0.05 of each other. For the visible wavelength range and an incident light propagating in an incident plane that includes the x-direction, and for an s-polarized incident light, the plurality of alternating first and second polymeric layers has an average reflectance $Rs1$ for a first incident angle of less than about 10 degrees, and an average reflectance $Rs2$ for a second incident angle of greater than about 45 degrees. Further, for the visible wavelength range and the incident light propagating in the incident plane, and for a p-polarized incident light, the plurality of alternating first and second polymeric layers has an average reflectance $Rp1$ for the first incident angle, and an average reflectance $Rp2$ for the second incident angle. Each of $Rs2/Rs1$ and $Rp2/Rp1$ is greater than about 1.15.

In a second aspect, the present disclosure provides a backlight for providing illumination to a display panel configured to form an image. The backlight includes an extended light source configured to emit light through an emission surface thereof. The extended light source further includes a back reflector. The backlight further includes the multilayer partial mirror of the first aspect. The multilayer partial mirror is disposed on the emission surface and is configured to receive the emitted light and transmit a portion of the received light therethrough. The multilayer partial mirror and the back reflector form a recycling optical cavity therebetween.

In a third aspect, the present disclosure provides a display system including a display panel disposed on the backlight of the second aspect.

In a fourth aspect, the present disclosure provides a multilayer partial mirror. The multilayer partial mirror includes a plurality of alternating first and second polymeric layers numbering at least 50 in total. Each of the first and second polymeric layers has an average thickness of less than about 500 nm. Further, the first and second polymeric layers include respective indices $nx1$ and $nx2$ along a same in-plane x-direction, respective indices $ny1$ and $ny2$ along an in-plane y-direction orthogonal to the x-direction, and respective indices $nz1$ and $nz2$ along a z-direction of the polymeric layers orthogonal to the x- and y-directions. For at least one wavelength in a visible wavelength range extending from about 420 nm to about 680 nm, $nz1$ is less than each of $nx1$ and $nx2$ by at least 0.06. For the at least one wavelength in the visible wavelength range, a magnitude of a difference between $nx2$ and $((nx1+nz1)/2)$ is less than about 0.05. Further, for the at least one wavelength in the visible wavelength range, $nx2$ and $nz2$ are within about 0.05 of each other. For the visible wavelength range, an infrared wavelength range from about 800 nm to about 1300 nm, an incident light propagating in an incident plane that includes the x-direction, and for a first incident angle of less than about 10 degrees, the plurality of alternating first and second polymeric layers has an average reflectance $Rp1$ for the incident light polarized along the x-direction and an average reflectance $Rs1$ for the incident light polarized along the y-direction. Each of $Rp1$ and $Rs1$ is less than about 85% for the visible wavelength range and less than about 50% for the infrared wavelength range. Further, for the visible wavelength range, the infrared wavelength range, the incident light propagating in the incident plane, and for a second incident angle of greater than about 45 degrees, the plurality of alternating first and second polymeric layers has average reflectances $Rp2$ and $Rs2$ for respective p- and s-polarized incident lights. Each of $Rp2$ and $Rs2$ is greater than about 70% for the visible wavelength range.

In a fifth aspect, the present disclosure provides a multilayer partial mirror. The multilayer partial mirror includes a plurality of alternating first and second polymeric layers numbering between about 50 and 600 in total. The plurality of alternating first and second polymeric layers are disposed between integrally formed opposing first and second polymeric skin layers. Each polymeric layer disposed between the first and second polymeric skin layers has an average thickness of less than about 500 nm. For at least one wavelength in a visible wavelength range extending from about 420 nm to about 680 nm, each of the first and second polymeric layers has an in-plane birefringence of less than about 0.05. For the at least one wavelength in the visible wavelength range, the first polymeric layers have an out-of-plane birefringence of greater than about 0.06. Further, for the at least one wavelength in the visible wavelength range, the second polymeric layers have an out-of-plane birefringence of less than about 0.02. For the visible wavelength range, and an incident light propagating in an incident plane that includes a same in-plane first direction and at a first incident angle of less than about 10 degrees, the multilayer partial mirror has an average reflectance Rs1 for the incident light being s-polarized, and an average reflectance Rp1 for the incident light being p-polarized. Rp1/Rs1 is between about 0.8 and about 1.2. An optical reflectance of the multilayer partial mirror versus wavelength for the first incident angle, and for each of the p- and s-polarized incident lights includes a reflectance band edge between about 760 nm and about 980 nm.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
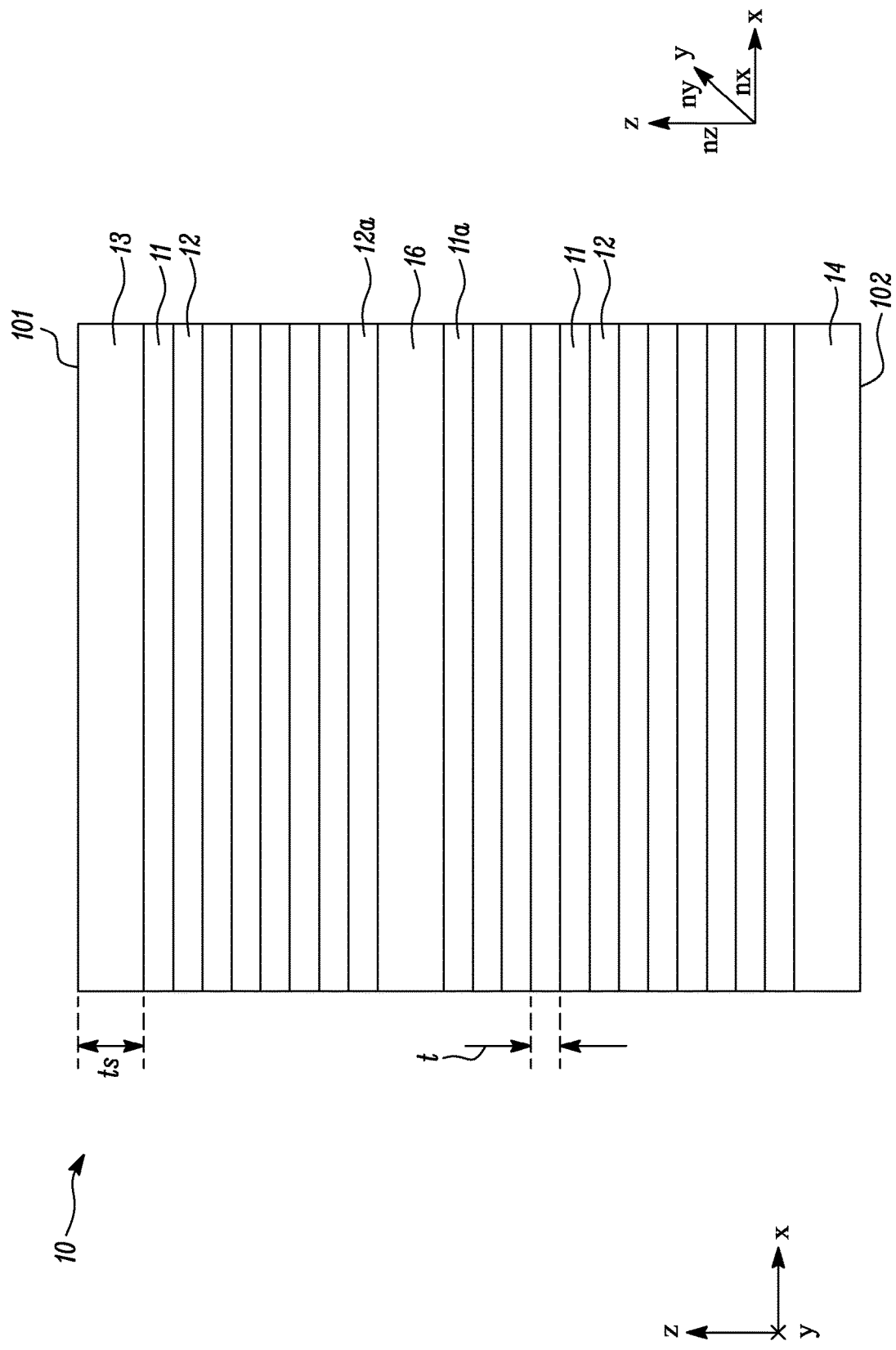
FIG. 1 illustrates a detailed schematic sectional view of a multilayer partial mirror, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, the term "film" generally refers to a material with a very high ratio of length or width to thickness. A film has two major surfaces defined by a length and width. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "between about", unless otherwise specifically defined, generally refers to an inclusive or a closed range. For example, if a parameter X is between about A and B, then A≤X≤B.

As used herein, the term "index", unless otherwise specifically defined, generally refers to a refractive index of a material or a layer. Similarly, the term "indices", unless otherwise specifically defined, generally refers to refractive indices of multiple materials or layers.

The present disclosure relates to a multilayer partial mirror, and a backlight including the multilayer partial mirror. The backlight including the multilayer partial mirror may be used in a display system or an optical system. For example, the multilayer partial mirror may be used in the backlight of display devices. The display devices may be incorporated into electronic devices, such as computer monitors, televisions, mobile phones, personal digital assistants (PDAs), wearable devices and other portable devices. Some other examples may include optical biometric scanners, such as fingerprint scanners, retina scanners etc.

In some examples, the display devices including a liquid crystal display (LCD) panel further include a backlight as the LCD panel is not self-illuminating. Light emitted by the backlight passes through the LCD panel to reach a viewer. In some other examples, the display devices may include an organic light emitting display (OLED). In yet other examples, the display devices may include displays, such as a liquid crystal on Silicon (LCoS) display, a micro light emitting diode (LED) display. In some examples the display devices may be used for augmented reality (AR) or virtual reality (VR) applications. Typically, the light emitted by the display is recycled to reduce a power consumption of the display device. In order to recycle the light, a collimating reflective polarizer, such as a collimating multilayer optical film (CMOF) may be used.

The display devices may also be susceptible to optical artifacts, such as reflective Moiré. The collimating reflective polarizers may further be used in the display devices for eliminating such optical artifacts. Specifically, the collimating reflective polarizers may be disposed between diffusers and display panels of the display devices in order to eliminate such optical artifacts. However, the diffusers may depolarize light polarized by the collimating reflective polarizers. In such cases, an additional non-collimating reflective polarizer (APF) is generally used to repolarize light. However, this may decrease an axial luminance of the display devices. Further, the CMOF typically collimates light polarized along one direction and substantially reflects light polarized along one other direction orthogonal to the one direction. As a result, the light polarized along the one other direction is not collimated, leading to a reduced axial luminance. In some cases, in order to increase the axial luminance, a power consumption of the display device may be increased. This may adversely affect a battery life of the electronic device including the display device.

In an aspect, the present disclosure provides a multilayer partial mirror. The multilayer partial mirror includes a plurality of alternating first and second polymeric layers numbering at least 50 in total. The plurality of alternating first and second layers are disposed between, and integrally formed with, opposing first and second polymeric skin layers. Each of the first and second polymeric layers has an average thickness of greater than about 0.5 microns. The first and second polymeric layers include respective indices $nx1$ and $nx2$ along a same in-plane x-direction, respective indices $ny1$ and $ny2$ along an in-plane y-direction orthogonal to the x-direction, and respective indices $nz1$ and $nz2$ along a z-direction of the polymeric layers orthogonal to the x- and y-directions. For at least one wavelength in a visible wavelength range extending from about 420 nanometers (nm) to about 680 nm, $nx1$ and $ny1$ are within about 0.05 of each other. For the at least one wavelength in the visible wavelength range, $nz1$ is less than each of $nx1$ and $nx2$ by at least 0.06. For the at least one wavelength in the visible wavelength range, for each of the first and second polymeric skin layers, corresponding indices of the polymeric skin layer and one of the first polymeric layers and second polymeric layers along each of x-, y-, and z-directions are within about 0.05 of each other. For the visible wavelength range and an incident light propagating in an incident plane that includes the x-direction, and for an s-polarized incident light, the plurality of alternating first and second polymeric layers has an average reflectance $Rs1$ for a first incident angle of less than about 10 degrees, and an average reflectance $Rs2$ for a second incident angle of greater than about 45 degrees. Further, for the visible wavelength range and the incident light propagating in the incident plane, and for a p-polarized incident light, the plurality of alternating first and second polymeric layers has an average reflectance $Rp1$ for the first incident angle, and an average reflectance $Rp2$ for the second incident angle. Each of $Rs2/Rs1$ and $Rp2/Rp1$ is greater than about 1.15.

Therefore, for the visible wavelength range, and for each of the s-polarized light and the p-polarized light, the multilayer partial mirror has a higher average optical reflectance for light incident at the second incident angle of greater than about 45 degrees (i.e., an off-axis light) than for light incident at the first incident angle of less than about 10 degrees (i.e., substantially normally incident light or an on-axis light). In other words, for the visible wavelength range, and for each of the s-polarized light and the p-polarized light, the multilayer partial mirror has a greater optical transmittance for the on-axis light than for the off-axis light. Since, for the visible wavelength range, the multilayer partial mirror may substantially collimate the off-axis light for both the s-polarized light and the p-polarized light, the multilayer partial mirror may provide an improved collimation than a conventional collimating film which typically reflects only one of an s-polarized light and a p-polarized light incident at the second incident angle. Further, for the visible wavelength range, the multilayer partial mirror may have less average optical reflectance for the on-axis light as compared to the conventional collimating film which substantially blocks even the on-axis light polarized along one direction (one of the s-polarized light and the p-polarized light). Optical reflectance for the on-axis light is generally not desirable as it may lower the on-axis luminance. Thus, for the visible wavelength range, less average optical reflectance for the on-axis light may improve an axial luminance of a display system including the multilayer partial mirror.

Further, a reflection band edge of the multilayer partial mirror may be adjusted to allow a light in an infrared wavelength range to pass, thereby enabling the display devices including the multilayer partial mirror for fingerprint sensing applications.

Referring now to figures, FIG. 1 illustrates a detailed schematic sectional view of a multilayer partial mirror 10, according to an embodiment of the present disclosure. The multilayer partial mirror 10 may be interchangeably referred to as "the mirror 10". The mirror 10 defines mutually orthogonal x-, y-, and z-directions. The x- and y-directions correspond to in-plane axes of the mirror 10, while the z-direction is a transverse axis disposed along a thickness of the mirror 10. In other words, x- and y-directions are along a plane (i.e., x-y plane) of the mirror 10, and the z-direction is perpendicular to the plane of the mirror 10, i.e., along the thickness of the mirror 10. The z-direction may be interchangeably referred to as "the thickness direction". The mirror 10 further defines mutually orthogonal first and second directions. In some embodiments, the first and second directions are along in-plane axes of the mirror 10. In other words, the first and second directions correspond to the x- and y-directions, respectively.

In some embodiments, the mirror 10 includes opposing first and second major surfaces 101, 102. In some embodiments, the first and second major surfaces 101, 102 of the mirror 10 are exposed to an external environment. In such embodiments, the first and second major surfaces 101, 102 of the mirror 10 may form first and second mirror-environment interfaces with the external environment, respectively. In some embodiments, the external environment includes air.

The mirror 10 incudes a plurality of alternating first and second polymeric layers 11, 12. The plurality of alternating first and second polymeric layers 11, 12 may be interchangeably referred to as "the alternating first and second polymeric layers 11, 12", or as "the first and second polymeric layers 11, 12", or as "the polymeric layers 11, 12".

The plurality of alternating first and second polymeric layers 11, 12 number at least 50 in total. In some embodiments, the plurality of alternating first and second polymeric layers 11, 12 number at least 100, at least 200, at least 300, or at least 400 in total. In some embodiments, the plurality of alternating first and second polymeric layers 11, 12 number between about 50 and about 600 in total. In some embodiments, the plurality of alternating first and second polymeric layers 11, 12 number between about 100 and about 500, between about 200 and about 450, or between about 300 and about 450 in total. As shown in FIG. 1, the plurality of alternating first and second polymeric layers 11, 12 are stacked in an alternating configuration along the thickness direction of the mirror 10.

In some embodiments, multilayer partial mirrors (such as the mirror 10) may be multilayer optical films (MOFs) that have previously been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers (such as the first and second polymeric layers 11, 12). Further, such multilayer optical films may be compatible with high volume manufacturing processes and may be manufactured and stored as large sheets and roll goods.

A multilayer optical film includes a plurality of layers having differing refractive index characteristics so that at least some of a light incident on them is reflected at interfaces between adjacent layers. The layers are generally sufficiently thin so that light reflected at a plurality of the interfaces between the adjacent layers undergoes constructive or destructive interference in order to give the multilayer optical film desired reflective or transmissive properties. For multilayer optical films designed to reflect light at ultraviolet, visible, or near-infrared wavelengths, each of the layers generally has an optical thickness (a physical thickness of the layer multiplied by a corresponding refractive index) of less than about 1 μm. Layers having a higher optical thickness may be included, such as skin layers at outer surfaces of the multilayer optical film, or protective boundary layers (PBLs) disposed within the multilayer optical films, that separate coherent groupings (referred to herein as "packets") of the layers.

For polarizing applications, e.g., for reflective polarizers, at least some of the layers may include birefringent polymers, in which the a refractive index of a layer has differing values along orthogonal Cartesian axes of the polymer. Birefringent polymers can also be used in non-polarizing applications.

In some cases, the layers have thicknesses and refractive indices corresponding to a ¼-wave stack, i.e., arranged in optical repeat units or unit cells, each optical repeat unit or unit cell having two adjacent layers having substantially equal optical thicknesses (f-ratio=50%). Such an optical repeat unit reflects, by constructive interference, a light whose wavelength k is twice the overall optical thickness of the optical repeat unit. Other layer arrangements, such as multilayer optical films having two layer optical repeat units whose f-ratio is different from 50%, or multilayer optical films whose optical repeat units include more than two layers, are also known. Multilayer optical films with such optical repeat units can be configured to reduce or to increase certain higher-order reflections, see, e.g., U.S. Pat. No. 5,360,659 (Arends et al.) and U.S. Pat. No. 5,103,337 (Schrenk et al.). A thickness gradients along a thickness direction (such as a z-direction) the multilayer optical film can be used to provide a widened reflection band, such as a reflection band that extends over a substantial portion of the a visible wavelength range, and may include a near infrared wavelength range so that, as the reflection band shifts to shorter wavelengths, for a light incident at an oblique incident angle, the layers have a reflectance over the visible wavelength range. Thickness gradients tailored to sharpen band edges, i.e., the wavelength transition between high reflection and high transmission, as discussed in U.S. Pat. No. 6,157,490 (Wheatley et al.).

Further details of multilayer optical films and related designs and constructions may be as discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, an ultraviolet (UV) absorbing layer can be added at a side of the multilayer optical film where the light is incident on it to protect components of the multilayer optical film from degradation caused by UV light. The multilayer optical films can be attached to mechanically reinforcing layers using a UV-curable acrylate adhesive or other suitable materials. Such reinforcing layers may include polymers such as polyethylene terephthalate (PET) or polycarbonate, and may also include structured surfaces that provide optical function such as light diffusion or collimation, e.g., by the use of beads or prisms. The multilayer optical films may further include additional layers and coatings, such as scratch resistant layers, tear resistant layers, and stiffening agents, see, e.g., U.S. Pat. No. 6,368,699 (Gilbert et al.). Methods and devices for making multilayer optical films are discussed in U.S. Pat. No. 6,783,349 (Neavin et al.).

Figure 2A:
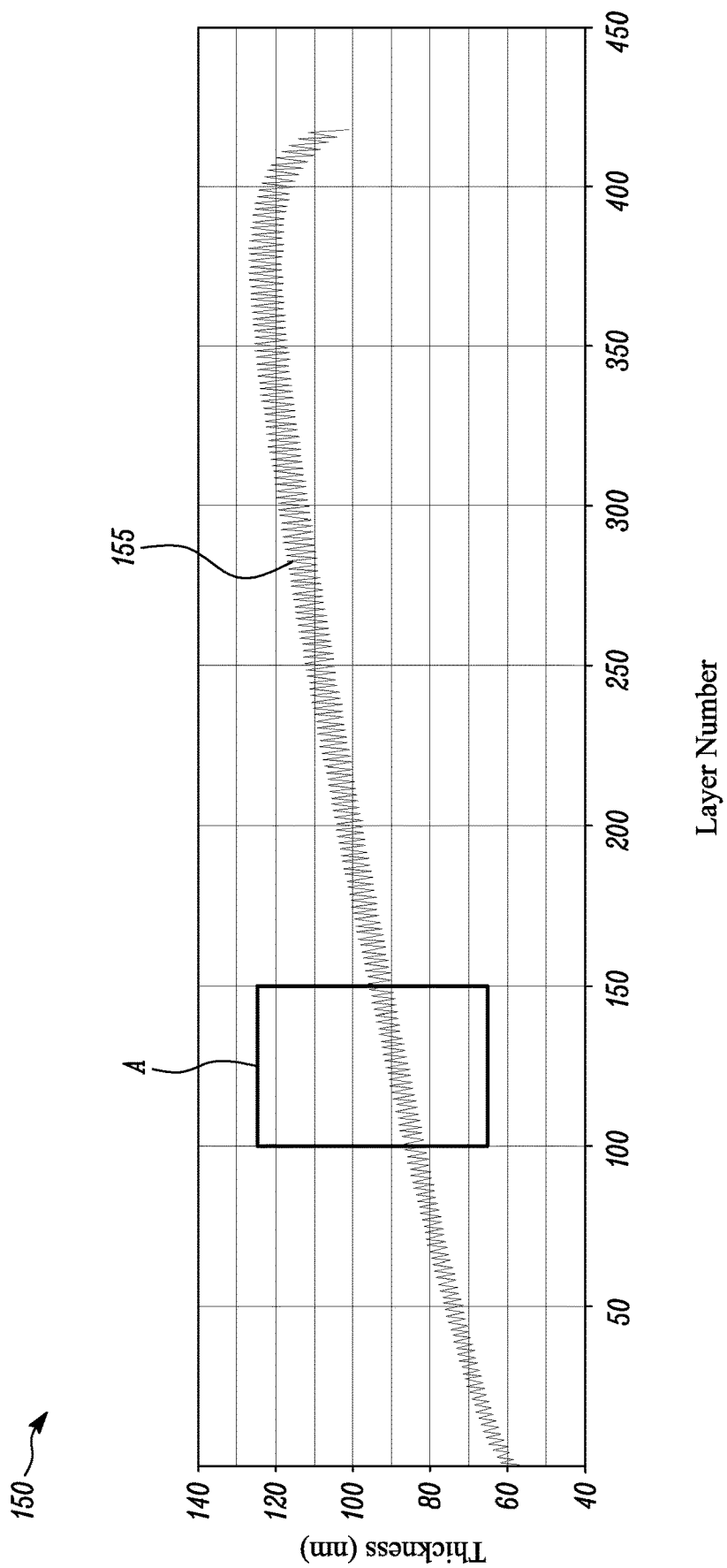
FIG. 2A illustrates a plot depicting variation in thickness of a plurality of alternating first and second polymeric layers of the multilayer partial mirror, according to an embodiment of the present disclosure.
Figure 2B:
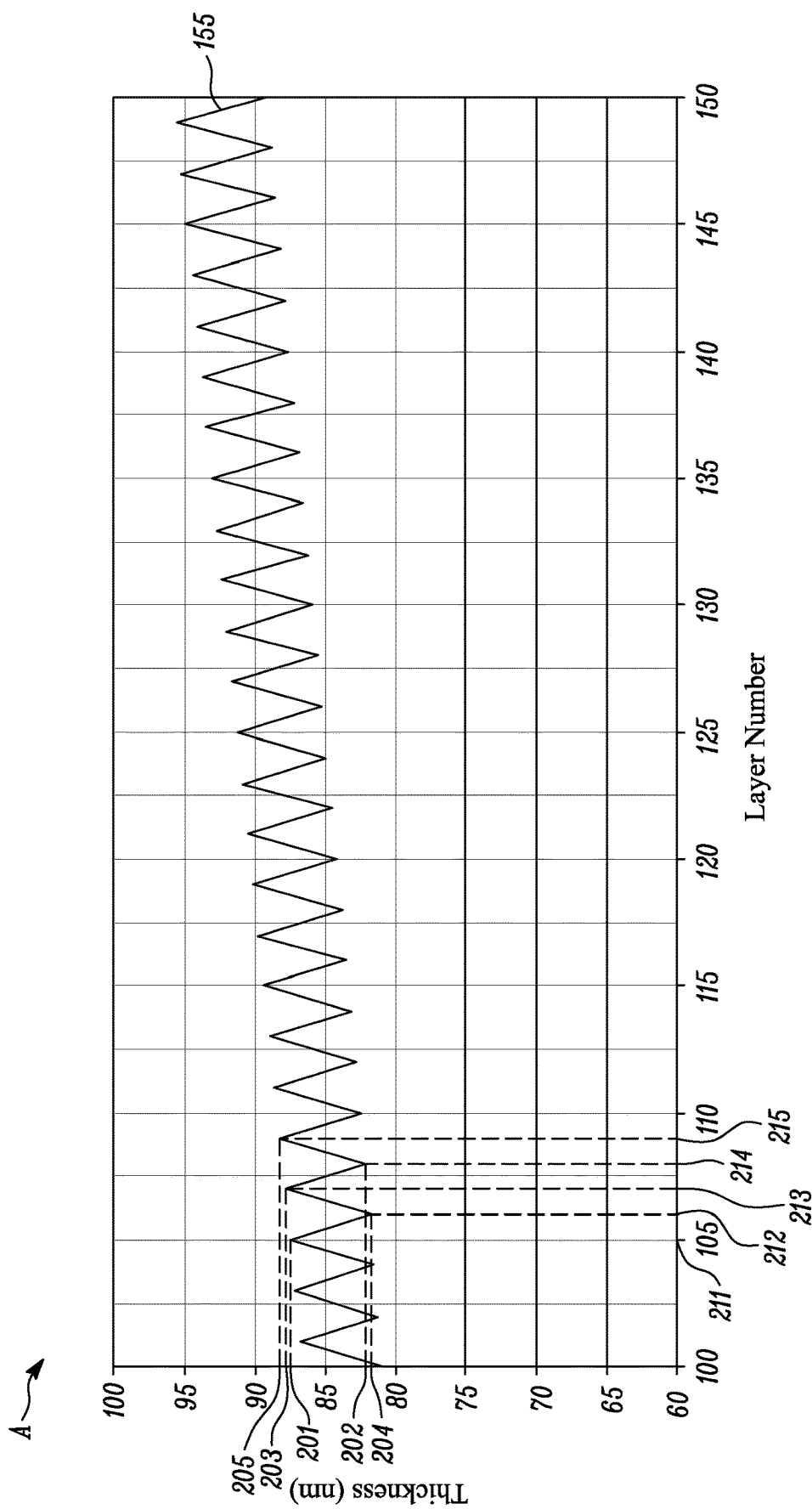
FIG. 2B illustrates an enlarged view of a portion of the plot of FIG. 2A, according to an embodiment of the present disclosure.

Generally, reflective and transmissive properties of a multilayer optical film (such as the mirror 10) may be a function of refractive indices (such as $nx_1$, $ny_1$, $nz_1$, $nx_2$, $ny_2$, $nz_2$) of the respective layers (such as the first and second polymeric layers 11, 12) and the average thicknesses (such as average thickness t) and a variation in thickness of the layers (such as described in FIGS. 2A and 2B). Each layer can be characterized at least in localized positions in the multilayer optical film by in-plane refractive indices (such as $nx_1$, $ny_1$, $nx_2$, $ny_2$) and a refractive index (such as $nz_1$, $nz_2$) associated with a thickness direction of the multilayer optical film. These refractive indices may represent the corresponding refractive indices of the layers of the multilayer optical film for a light polarized along mutually orthogonal x- and y-directions, respectively.

In some cases, the layers of the multilayer optical film may be oriented along the x-direction of the multilayer optical film, such that a magnitude of a difference of $nx_1$ and $nx_2$ ($\Delta nx$) may have a maximum value. For ease of explanation in the present patent application, unless otherwise specified, the x-, y-, and z-directions are assumed to be local Cartesian coordinates applicable to any point of interest on a multilayer optical film, in which the layers extend parallel to the x-y plane, and wherein the x-axis is oriented within the plane of the multilayer optical film to maximize the magnitude of $\Delta nx$. In such cases, a magnitude of a difference of $ny_1$ and $ny_2$ ($\Delta ny$) may be equal to or less than, but not greater than the magnitude of $\Delta nx$. Furthermore, materials for a first layer of the multilayer optical film may be dictated by requiring that $\Delta nx$ be non-negative. In other words, the materials for the layers may be chosen such that $nx_1$ is equal to or greater than $nx_2$, such that $\Delta nx \geq 0$. In practice, the refractive indices of the layers of the multilayer optical film may be controlled by judicious materials selection and processing conditions.

The multilayer optical film may be made by co-extrusion of a plurality (e.g., tens or hundreds) of layers of alternating polymers A, B, sometimes followed by passing a multilayer extrudate of the alternating polymers A, B through one or more multipliers, and then stretching or otherwise orienting the multilayer extrudate to form a final film. The resulting film is typically composed of a plurality of alternating layers whose thicknesses and refractive indices are tailored to provide one or more reflection bands in desired region(s) of an electromagnetic spectrum, such as in the visible or near infrared ranges.

In some cases, to achieve a targeted reflectivity for a light polarized along one direction (such as the x-direction), the plurality of alternating layers may be tailored to exhibit a difference in their refractive indices (such as $\Delta nx$) for the light polarized along the one direction of at least about 0.04. In such cases, to further achieve a targeted reflectivity for a light polarized along an orthogonal direction to the one direction (such as the y-direction), the plurality of alternating layers may be tailored to exhibit a difference in their refractive indices (such as $\Delta ny$) for the light polarized along the direction orthogonal to the one direction of at least about 0.05. The '774 (Jonza et al.) patent referenced above describes, among other things, how a difference of $nz_1$ and $nz_2$ ($\Delta nz$) can be tailored to achieve desirable reflectivity for an obliquely incident p-polarized light. In some cases, to maintain high reflectivity of the obliquely incident p-polarized light, the alternating layers may be tailored such that $\Delta nz$ may be substantially less than the maximum in-plane refractive index difference (i.e., $\Delta nx$). in some cases, $\Delta nz \leq 0.5*\Delta nx$, or $\Delta nz \leq 0.25*\Delta nx$. In some cases, $\Delta nz$ may have a zero or near zero value, which may yield interfaces between the alternating layers whose reflectivity for p-polarized light may remain substantially constant as a function of an incident angle of the p-polarized light. In some other cases, $\Delta nz$ may be less than 0, which may yield interfaces whose reflectivity for p-polarized light increases with increasing incident angle of the p-polarized light. In some cases, the values of $\Delta nx$, $\Delta ny$ and $\Delta nz$ may be similarly tailored to achieve target reflectivities for an s-polarized light.

The '774 (Jonza et al.) patent further discusses certain design considerations relating to multilayer optical films that may be configured as polarizers, referred to as multilayer reflecting or reflective polarizers. In many applications, an ideal reflecting polarizer may have a substantially high reflectance along one axis (an "extinction" or "block" axis) and substantially zero reflectance along another other axis (a "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 600 incidence is measured in p-polarized pass light. If some reflectivity occurs along the transmission axis, an efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices $n_{1y}$ and $n_{2y}$. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

In some examples, a fabrication method for the multilayer may include: (a) providing at least a first and a second stream of resin corresponding to the first and second polymers A, B to be used in the finished film; (b) dividing the first and the second streams into a plurality of layers using a suitable feedblock, such as one that may include: (i) a gradient plate including first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each of the first and second plurality of conduits feeding its own respective slot die, each of the first and second plurality of conduits having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to respective major surfaces of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce a near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g., via a tenter), along the down-web direction (e.g., via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the alternating layers may be chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

The multilayer optical film can be made using any suitable light-transmissive materials, but in many cases, it may be beneficial to use low absorption polymer materials. With such materials, absorption of the layers over visible and infrared wavelengths can be made small or negligible, such that, at any given wavelength and for any specified incident angle and polarization state of an incident light incident on the multilayer optical film, the sum of reflectance (R) and transmission (T) for the multilayer optical film is approximately 100%, i.e., R+T≈100%, or R≈100%−T. Exemplary multilayer optical films may be composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films".

In some embodiments, the polymeric layers 11, 12 may include one or more polymeric materials, for example, polyhexylethylene naphthalate (PHEN), polyethylene naphthalate (PEN), copolymers containing PHEN, PEN and/or other polyesters (e.g., polyethylene terephthalate (PET) or polyesters containing dibenzoic acid), glycol modified polyethylene terephthalate, polycarbonate (PC), poly (methyl methacrylate) (PMMA), or blends of these classes of materials.

In some embodiments, the first polymeric layers 11 may include a high index optical (HIO) layer. In some examples, the first polymeric layers 11 may include a PHEN copolymer with a resultant proportion of hexanediol of between about 30 mol % and about 70 mol % on a diols basis in the final polymer.

In some embodiments, the second polymeric layers 12 may include a low index optical (LIO) layer. In some examples, the second polymeric layers 12 may include the PHEN copolymer with the resultant proportion of hexanediol of between about 30 mol % and 70 mol % on a diols basis in the final polymer. In some examples, the second polymeric layers may include a blend of the PHEN copolymer and PET, with levels of PET between 30% and 70% by weight of the final polymer.

The first and second polymeric layers 11, 12 include respective indices nx1 and nx2 along the same in-plane x-direction. Specifically, the first polymeric layers 11 include the index nx1 along the in-plane x-direction, and the second polymeric layers 12 include the index nx2 along the same in-plane x-direction. In other words, each first polymeric layer 11 includes the refractive index nx1 along the x-direction. Each second polymeric layer 12 includes the refractive index nx2 along the x-direction.

In some embodiments, the index nx1 is between about 1.6 and about 1.76, i.e., 1.6≤nx1≤1.76. In some examples, the index nx1 may be about 1.690, about 1.739, or about 1.740.

In some embodiments, the index nx2 is between about 1.55 and about 1.75, i.e., 1.55≤nx2≤1.75. In some examples, the index nx2 may be about 1.620, about 1.628, or about 1.629.

The first and second polymeric layers 11, 12 include respective indices ny1 and ny2 along the in-plane y-direction orthogonal to the x-direction. Specifically, the first polymeric layers 11 include the index ny1 along the in-plane y-direction, and the second polymeric layers 12 include the index ny2 along the in-plane y-direction. In other words, each first polymeric layer 11 includes the refractive index ny1 along the y-direction. Each second polymeric layer 12 includes the refractive index ny2 along the y-direction.

In some embodiments, the index ny1 is between about 1.6 and about 1.76, i.e., 1.6≤ny1≤1.76. In some examples, the index ny1 may be about 1.695, about 1.739, or about 1.740.

In some embodiments, the index ny2 is between about 1.55 and about 1.75, i.e., 1.55≤ny2≤1.75. In some examples, the index ny2 may be about 1.620, 1.628, or about 1.629.

The first and second polymeric layers 11, 12 further include respective indices nz1 and nz2 along the thickness direction of the polymeric layers 11, 12 orthogonal to the x- and y-directions. Specifically, the first polymeric layers 11 include the index nz1 along the thickness direction, and the second polymeric layers 12 include the index nz2 along the thickness direction. In other words, each first polymeric layer 11 includes the refractive index nz1 along the z-direction. Each second polymeric layer 12 includes the refractive index nz2 along the z-direction.

In some embodiments, the index nz1 is between about 1.5 and about 1.55, i.e., 1.5≤nz1≤1.55. In some examples, the index nz1 may be about 1.510, about 1.513, or about 1.514.

In some embodiments, the index nz2 is between about 1.6 and about 1.7, i.e., 1.6≤nz2≤1.7. In some examples, the index nz2 may be about 1.620, about 1.623, or about 1.624.

In some embodiments, for at least one wavelength in a visible wavelength range 95 (shown in FIGS. 4A-4D) extending from about 420 nanometers (nm) to about 680 nm, nx1 and ny1 are within about 0.05 of each other. In some embodiments, the at least one wavelength in the visible wavelength range 95 is a red wavelength. In some embodiments, the at least one wavelength in the visible wavelength range 95 is about 633 nm. In other words, for the at least one wavelength in the visible wavelength range 95, a magnitude of a difference between nx1 and ny1 may be less than or equal to about 0.05, i.e., |nx1−ny1|≤0.05. Therefore, in some cases, nx1 and ny1 may be substantially equal to each other. In other words, the first polymeric layers 11 may have an in-plane birefringence of less than about 0.05. Generally, birefringence refers to a measure of optical anisotropy in a material. Moreover, birefringence is measured as a difference between two refractive indices of a material along two mutually perpendicular directions (e.g., x- and y-directions). In some embodiments, for the at least one wavelength in the visible wavelength range 95, nx1 and ny1 are within about 0.02, within about 0.015, within about 0.01, within about 0.0075, within about 0.005, within about 0.004, within about 0.003, or within about 0.002 of each other.

In some embodiments, for the at least one wavelength in the visible wavelength range 95, nz1 is less than each of nx1 and nx2 by at least 0.06. In other words, a difference between nx1 and nz1 may be greater than or equal to 0.06, i.e., (nx1−nz1)≥0.06, and a difference between nx2 and nz1 may be greater than or equal to 0.06, i.e., (nx2−nz1)≥0.06. In some embodiments, for the at least one wavelength in the visible wavelength range 95, nz1 is less than each of nx1 and nx2 by at least 0.08, at least 0.1, at least 0.12, at least 0.14, at least 0.16, at least 0.18, at least 0.20, at least 0.21, or at least 0.22. Therefore, for the at least one wavelength in the visible wavelength range 95, the first polymeric layers 11 have an out-of-plane birefringence of greater than about 0.06.

In some embodiments, for the at least one wavelength in the visible wavelength range 95, nx2, ny2 and nz2 are within about 0.05 of each other. In some embodiments, a magnitude of a difference between nx2 and ny2 may be less than or equal to about 0.05, i.e., |nx2−ny2|≤0.05, a magnitude of a difference between ny2 and nz2 may be less than or equal to about 0.05, i.e., |ny2−nz2|≤0.05, and a magnitude of a difference between nz2 and nx2 may be less than or equal to about 0.05, i.e., |nz2−nx2|≤0.05. In some embodiments, for the at least one wavelength in the visible wavelength range 95, nx2, ny2 and nz2 are within about 0.02, within about 0.015, within about 0.01, within about 0.0075, within about 0.005, or within about 0.0025 of each other. Therefore, in some cases, nx2, ny2 and nz2 may be substantially equal to each other. Further, in some examples, the second polymeric layers 12 may be isotropic.

In some embodiments, for the at least one wavelength in the visible wavelength range 95, a magnitude of a difference between nx2 and ((nx1+nz1)/2) is less than about 0.05. In other words, the magnitude of the difference between nx2 and an average of nx1 and nz1 is less than about 0.05, i.e., |nx2−((nx1+nz1)/2)|<0.05. In some embodiments, for the at least one wavelength in the visible wavelength range 95, the magnitude of the difference between nx2 and ((nx1+nz1)/2) is less than about 0.045, less than about 0.04, less than about 0.035, less than about 0.03, less than about 0.025, less than about 0.02, less than about 0.015, or less than about 0.01. Therefore, in some cases, nx2 may be substantially equal to the average of nx1 and nz1.

In some embodiments, for the at least one wavelength in the visible wavelength range 95, each of the first and second polymeric layers 11, 12 has an in-plane birefringence of less than about 0.05. Specifically, for the at least one wavelength in the visible wavelength range 95, each first polymeric layer 11 has the in-plane birefringence of less than about 0.05, i.e., |nx1−ny1|<0.05, and each second polymeric layer 12 has the in-plane birefringence of less than about 0.05, i.e., |nx2−ny2|<0.05. In some embodiments, for the at least one wavelength in the visible wavelength range 95, each of the first and second polymeric layers 11, 12 has the in-plane birefringence of less than about 0.4, less than about 0.03, less than about 0.02, or less than about 0.01. In some examples, |nx1−ny1| may be about 0.005. In some examples, |nx2−ny2| may be about 0.

In some embodiments, for the at least one wavelength in the visible wavelength range 95, the first polymeric layers 11 have an out-of-plane birefringence of greater than about 0.06. Specifically, for the at least one wavelength in the visible wavelength range 95, the first polymeric layers 11 have the out-of-plane birefringence, with respect to the z-direction, of greater than about 0.06, i.e., |nx1−nz1|>0.6, and |ny1−nz1|>0.6. In some embodiments, for the at least one wavelength in the visible wavelength range 95, the first polymeric layers 11 have the out-of-plane birefringence of greater than about 0.08, greater than about 0.12, greater than about 0.14, or greater than about 0.16. In some examples, |nx1−nz1| may be about 0.18. In some examples, |ny1−nz1| may be about 0.185.

In some embodiments, for the at least one wavelength in the visible wavelength range 95, the second polymeric layers 12 have an out-of-plane birefringence of less than about 0.02. Specifically, for the at least one wavelength in the visible wavelength range 95, the second polymeric layers 12 have the out-of-plane birefringence, with respect to the z-direction, of less than about 0.02, i.e., |nx2−nz2|<0.02, and |ny2−nz2|<0.02. In some embodiments, for the at least one wavelength in the visible wavelength range 95, the second polymeric layers 11 have an out-of-plane birefringence of less than about 0.015, less than about 0.01, less than about 0.005, or less than about 0.002. In some examples, |nx2−nz2| may be about 0. In some examples, |ny2−nz2| may be about 0. In some examples, the second polymeric layers 12 may be isotropic.

The mirror 10 further includes opposing first and second polymeric skin layers 13, 14. The first and second polymeric skin layers 13, 14 may be collectively referred to as "the polymeric skin layers 13, 14". Each of the first and second polymeric layers 11, 12 is disposed between the first and second polymeric skin layers 13, 14. In other words, the first and second polymeric skin layers 13, 14 include opposing major surfaces of the mirror 10. In some embodiments, the first and second polymeric skin layers 13, 14 include the respective first and second major surfaces 101, 102. Therefore, in some embodiments, the first and second polymeric skin layers 13, 14 form the respective first and second mirror-environment interfaces with the external environment. In some cases, the mirror 10 includes integrally formed opposing first and second polymeric skin layers 13, 14. The plurality of alternating first and second polymeric layers 11, 12 are disposed between the integrally formed opposing first and second polymeric skin layers 13, 14. In some cases, the plurality of alternating first and second polymeric layers 11, 12 are disposed between, and integrally formed with, the opposing first and second polymeric skin layers 13, 14.

Each of the polymeric skin layers 13, 14 has an average thickness "ts". Each of the polymeric skin layers 13, 14 defines the average thickness "ts" along the z-direction. The term "average thickness", as used herein, refers to an average thickness along a plane (i.e., the x-y plane) of a layer. Each of the polymeric skin layers 13, 14 has the average thickness "ts" of greater than about 0.5 microns. In some embodiments, each of the polymeric skin layers 13, 14 has the average thickness "ts" of greater than about 0.75 microns, greater than about 1 micron, greater than about 2 microns, greater than about 5 microns, greater than about 6 microns, greater than about 7 microns, greater than about 8 microns, greater than about 9 microns, greater than about 10 microns, greater than about 12 microns, or greater than about 15 microns.

In some embodiments, the first and second polymeric skin layers 13, 14 include substantially a same material composition. In some embodiments, the first polymeric layers 11 and at least one of the first and second polymeric skin layers 13, 14 include substantially a same material composition. In some embodiments, the second polymeric layers 12 and at least one of the first and second polymeric skin layers 13, 14 include substantially a same material composition.

In some embodiments, the first and second polymeric skin layers 13, 14 may include one or more polymeric materials, for example, PHEN, PEN, copolymers containing PHEN, PEN and/or other polyesters (e.g., PET or polyesters containing dibenzoic acid), glycol modified polyethylene terephthalate, PC, PMMA, or blends of these classes of materials.

In some embodiments, for the at least one wavelength in the visible wavelength range 95, and for each of the first and second polymeric skin layers 13, 14, corresponding indices of the polymeric skin layer 13, 14 and one of the first polymeric layers 11 and second polymeric layers 12 along each of the x-, y-, and z-directions are within about 0.05 of each other. In some embodiments, for the at least one wavelength in the visible wavelength range 95, and for each of the first and second polymeric skin layers 13, 14, the corresponding indices of the polymeric skin layer 13, 14 and one of the first polymeric layers 11 and second polymeric layers 12 along each of the x-, y-, and z-directions are within about 0.02, within about 0.015, within about 0.01, within about 0.0075, within about 0.005, or within about 0.0025 of each other.

As discussed above, in some embodiments, the first polymeric layers 11 and at least one of the first and second polymeric skin layers 13, 14 include substantially the same material composition. Therefore, in some embodiments, for each of the first and second polymeric skin layers 13, 14, corresponding indices of the polymeric skin layer 13, 14 and the first polymeric layers 11 along each of the x-, y- and z-directions are substantially similar. Specifically, for each of the first and second polymeric skin layers 13, 14, the corresponding indices of the polymeric skin layer 13, 14 and the first polymeric layers 11 along each of the x-, y- and z-directions are within about 0.05 of each other. In some embodiments, for each of the first and second polymeric skin layers 13, 14, the corresponding indices of the polymeric skin layer 13, 14 and the first polymeric layers 11 along each of the x-, y- and z-directions are within about 0.02, within about 0.015, within about 0.01, within about 0.0075, within about 0.005, or within about 0.0025 of each other.

As discussed above, in some embodiments, the second polymeric layers 12 and at least one of the first and second polymeric skin layers 13, 14 include substantially a same material composition. Therefore, in some embodiments, for each of the first and second polymeric skin layers 13, 14, corresponding indices of the polymeric skin layer 13, 14 and the second polymeric layers 12 along each of the x-, y- and z-directions are substantially similar. Specifically, for each of the first and second polymeric skin layers 13, 14, the corresponding indices of the polymeric skin layer 13, 14 and the second polymeric layers 12 along each of the x-, y- and z-directions are within about 0.05 of each other. In some embodiments, for each of the first and second polymeric skin layers 13, 14, the corresponding indices of the polymeric skin layer 13, 14 and the second polymeric layers 12 along each of the x-, y- and z-directions are within about 0.02, within about 0.015, within about 0.01, within about 0.0075, within about 0.005, or within about 0.0025 of each other.

In some embodiments, the mirror 10 may include at least one intermediate layer 16. In some embodiments, the at least one intermediate layer 16 has an average thickness greater than about 500 nm. In some embodiments, the at least one intermediate layer 16 is disposed between the pluralities of polymeric first and second layers 11, 12. Specifically, the at least one intermediate layer 16 may be disposed between two stacks of polymeric first and second layers 11, 12. In the illustrated embodiment of FIG. 1, the at least one intermediate layer 16 is disposed between first and second polymeric layers 11a, 12a. In some embodiments, a material composition of the at least one intermediate layer 16 may be substantially similar to a material composition of at least one of the first and second polymeric skin layers 13, 14.

In some embodiments, the polymeric skin layers 13, 14, the polymeric layers 11, 12 and the at least one intermediate layer 16 may be substantially co-extensive with each other, or of comparable in-plane dimensions (i.e., length and width). In other words, the polymeric skin layers 13, 14, the polymeric layers 11, 12 and the at least one intermediate layer 16 may be substantially co-extensive with each other in the x-y plane.

In some embodiments, the mirror 10 may include additional or intermediate layers, such as adhesive layers, substrate layers etc. The mirror 10 may have any suitable thickness based on desired application attributes.

FIG. 2A illustrates a plot 150 depicting a variation in thickness of the plurality of alternating first and second polymeric layers 11, 12 of the mirror 10, according to an embodiment of the present disclosure. The thickness of the plurality of alternating first and second polymeric layers 11, 12 is depicted in nanometers (nm) on the ordinate axis, and the layer number is depicted on the abscissa. Specifically, the plot 150 illustrates the average layer thickness in nm on the ordinate axis and the layer number on the abscissa. In the illustrated embodiment of FIG. 2A, the plot 150 depicts a variation in thickness of the plurality of alternating first and second polymeric layers 11, 12, from layers 1 to 420 of the mirror 10. The plot 150 includes a thickness curve 155 depicting the variation in thickness of the plurality of alternating first and second polymeric layers 11, 12 of the mirror 10. FIG. 2B illustrates an enlarged view of a portion A of the plot 150 depicting the variation in thickness of the plurality of alternating first and second polymeric layers 11, 12 from layers 100 to 150 of the mirror 10.

Referring now to FIGS. 1, 2A and 2B, each of the first and second polymeric layers 11, 12 has an average thickness "t". Specifically, each of the first and second polymeric layers 11, 12 defines the average thickness "t" along the z-direction. Each of the first and second polymeric layers 11, 12 may be interchangeably referred to as "each polymeric layer 11, 12". Each of the first and second polymeric layers 11, 12 has the average thickness "t" of less than about 500 nm. Specifically, each polymeric layer 11, 12 disposed between the first and second polymeric skin layers 13, 14 has the average thickness "t" of less than about 500 nm. In some embodiments, each of the first and second polymeric layers 11, 12 has the average thickness "t" of less than about 400 nm, less than about 300 nm, or less than about 200 nm.

As is apparent from the plot 150, in some embodiments, a difference between a maximum thickness and a minimum thickness of the alternating first and second polymeric layers 11, 12 is between about 45% and 65%. In some embodiments, the difference between the maximum thickness and the minimum thickness of the alternating first and second polymeric layers 11, 12 may be between about 50% and about 60%.

In the illustrated embodiment of FIG. 2A, the maximum thickness and the minimum thickness of the alternating first and second polymeric layers 11, 12 are 126.7 nm and 57.6 nm, respectively. Therefore, the difference between the maximum thickness and the minimum thickness of the alternating first and second polymeric layers 11, 12 is about 54.5%.

Further, in some embodiments, the thicknesses of the first polymeric layers 11 and the second polymeric layers 12 generally increase with the layer number until a threshold layer number between 350 and 400. Further, the thicknesses of the first polymeric layers 11 and the second polymeric layers 12 generally decrease with the layer number after the threshold layer number.

In some embodiments, a maximum difference between thicknesses of adjacent polymeric layers in the alternating first and second polymeric layers 11, 12 is less than about 25%. In some embodiments, the maximum difference between thicknesses of adjacent polymeric layers in the alternating first and second polymeric layers 11, 12 is less than about 20%, less than about 15%, or less than about 10%. In the illustrated embodiment of FIGS. 2A and 2B, the maximum difference between thicknesses of adjacent polymeric layers in the alternating first and second polymeric layers 11, 12 is about 10%.

The difference in thicknesses of adjacent polymeric layers 11, 12 is best illustrated in FIG. 2B. Specifically, the thickness curve 155 has multiple V-shaped segments indicating respective values of thickness of the alternating first and second layers polymeric layers 11, 12.

The thickness of each of the alternating first and second polymeric layers 11, 12 is a discrete value indicated by a peak or a valley of a respective V-shaped segment. FIG. 2B illustrates thicknesses of example polymeric layers 211, 212, 213, 214 and 215 (211-215). The polymeric layers 211, 212, 213, 214 and 215 may correspond to layer numbers 105, 106, 107, 108 and 109 illustrated in FIG. 2B. The polymeric layers 211-215 have corresponding thicknesses 201, 202, 203, 204, 205 (201-205). In this example, the polymeric layers 211, 213, 215 having respective thicknesses 201, 203, 205 may be the first polymeric layers 11, and the polymeric layers 212, 214 having respective thicknesses 202, 204 may be the second polymeric layers 12, such that the thicknesses of each of the second polymeric layers 12 is lesser than a thickness of an adjacent succeeding first polymeric layer 11.

However, in some examples, the polymeric layers 211, 213, 215 having respective thicknesses 201, 203, 205 may be the second polymeric layers 12, and the polymeric layers 212, 214 having the respective thicknesses 202, 204 may be the first polymeric layers 11, such that the thicknesses of each of the first polymeric layers 11 is lesser than a thickness of an adjacent succeeding second polymeric layer 12.

Figure 3B:
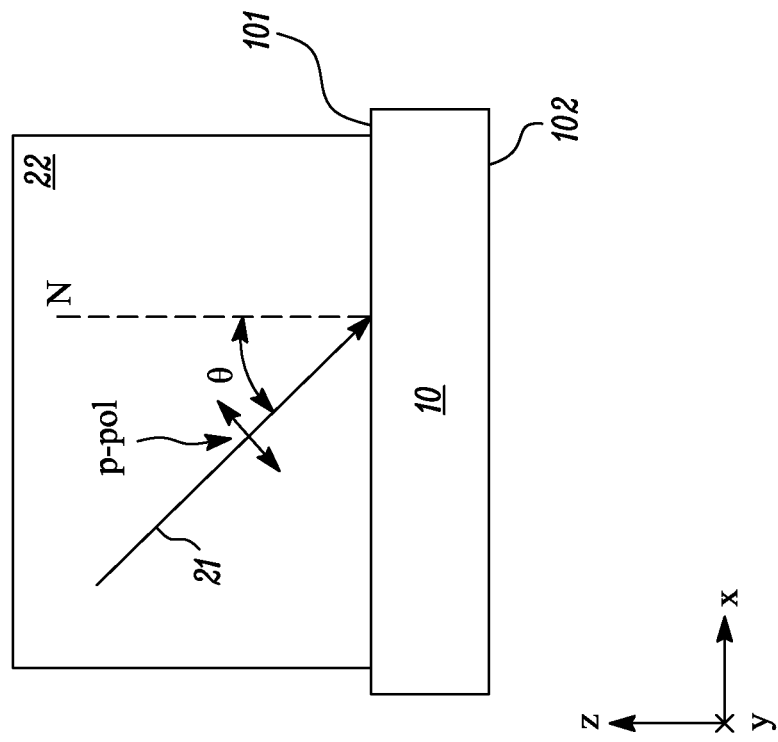
FIGS. 3A and 3B illustrate schematic sectional views of the multilayer partial mirror, according to an embodiment of the present disclosure.
Figure 3A:
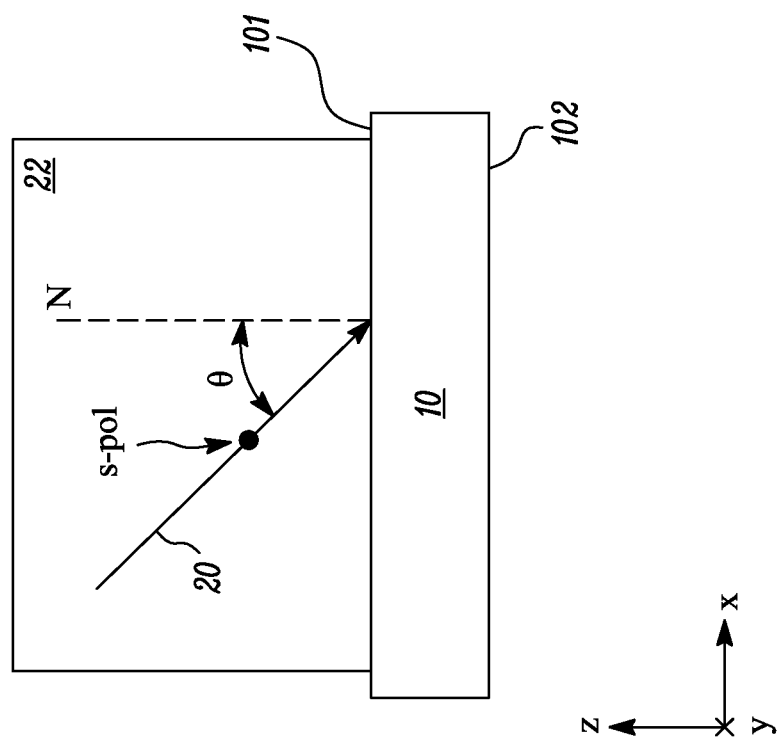

FIGS. 3A and 3B illustrate schematic sectional views of the mirror 10, according to an embodiment of the present disclosure. FIGS. 3A and 3B illustrate incident lights 20, 21, respectively, propagating in an incident plane 22.

The incident plane 22 includes the x-direction. The incident plane 22 may further include a normal N to the mirror 10. The normal N is substantially orthogonal to a plane (i.e., the x-y plane) of the mirror 10. In other words, the normal N is substantially along the z-direction of the mirror 10. The incident plane 22 substantially corresponds to the x-z plane of the mirror 10. In some embodiments, the incident plane 22 includes the same in-plane first direction. In some embodiments, the same in-plane is the x-z plane of the mirror 10 and the same in-plane first direction is the x-direction.

As shown in FIGS. 3A and 3B, each of the incident lights 20, 21 is incident on the mirror 10 at an incident angle θ with respect to the normal N. Specifically, each of the incident lights 20, 21 is incident on the mirror 10 at the first major surface 101 (i.e., at the first mirror-environment interface). However, in some embodiments, at least one of the incident lights 20, 21 may be incident on the mirror 10 at the second major surface 102 (i.e., at the second mirror-environment interface).

In some cases, the incident angle θ may be a first incident angle of less than about 10 degrees. In some embodiments, the first incident angle is less than about 9 degrees, less than about 8 degrees, less than about 7 degrees, less than about 6 degrees, less than about 5 degrees, less than about 4 degrees, less than about 3 degrees, less than about 2 degrees, or less than about 1 degree. In some examples, the first incident angle is about 0 degree.

In some cases, the incident angle θ may be a second incident angle of greater than about 45 degrees. In some embodiments, the second incident angle is greater than about 50 degrees, or greater than about 55 degrees. In some examples, the second incident angle is about 60 degrees.

Referring now to FIG. 3A, the incident light 20 is an s-polarized light. The incident light 20 may also be interchangeably referred to as "the s-polarized incident light 20", or as "the incident light that is s-polarized 20". The incident light 20 is polarized along the second direction. In some embodiments, the second direction may be along the y-direction. Therefore, the incident light 20 is polarized along the y-direction. The incident light 20 may be interchangeably referred to as "the incident light 20 polarized along the y-direction".

Referring now to FIG. 3B, the incident light 21 is a p-polarized light. The incident light 21 may also be interchangeably referred to as "the p-polarized incident light 21", or as "the incident light that is p-polarized 21". Specifically, in cases when the incident light 21 is incident at the first incident angle, the incident light 21 is polarized along the first direction. In some embodiments, the first direction may be along the x-direction. Therefore, in the cases when the incident light 21 is incident at the first incident angle, the incident light 21 may be polarized along the x-direction. The incident light 21 may be interchangeably referred to as "the incident light 21 polarized along the x-direction".

Figure 4A:
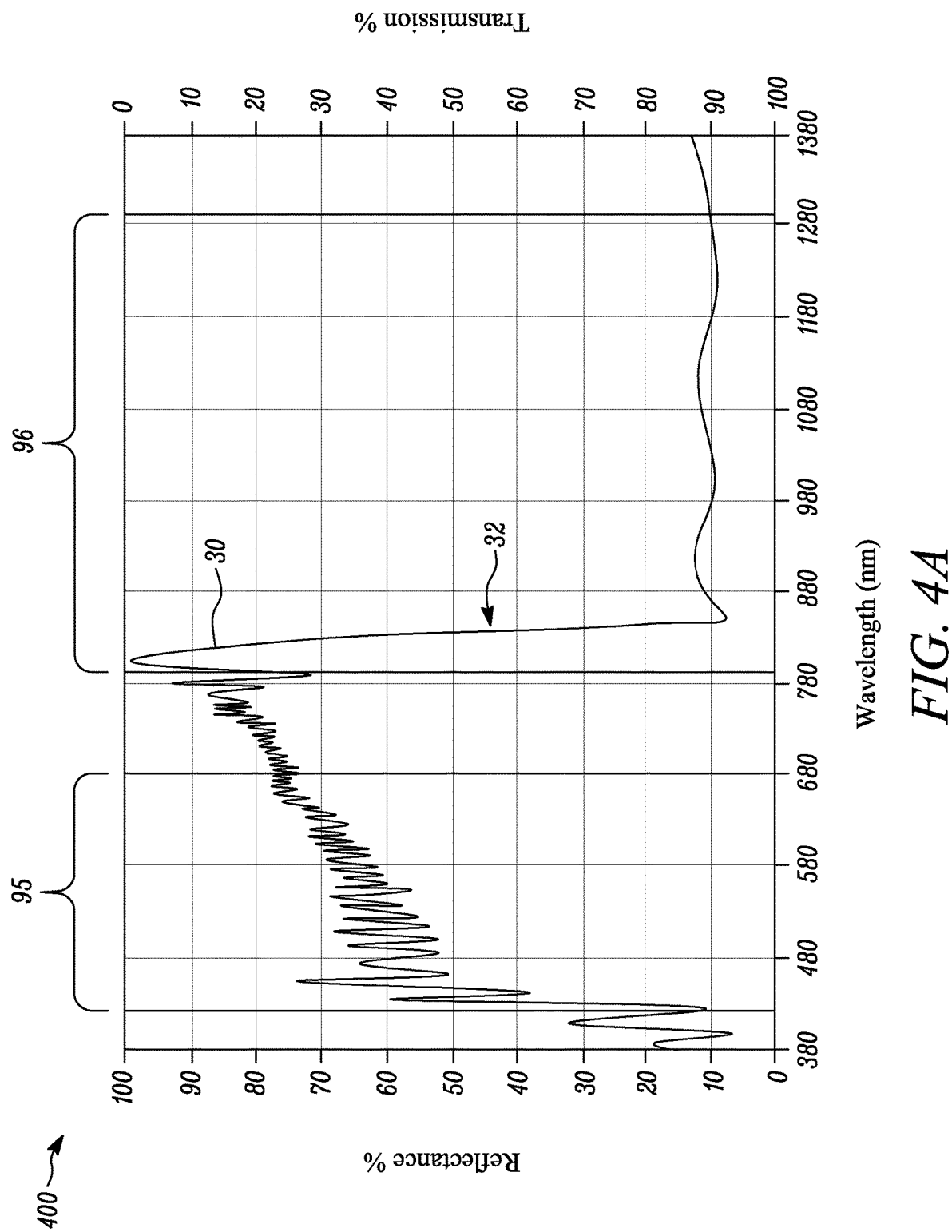
FIG. 4A illustrates a plot depicting optical reflectance of the multilayer partial mirror versus wavelength for an s-polarized incident light incident at a first incident angle, according to an embodiment of the present disclosure.

FIG. 4A illustrates a plot 400 depicting optical reflectance versus wavelength of the multilayer partial mirror 10 (shown in FIG. 1) for the s-polarized incident light 20 (shown in FIG. 3A) incident at the first incident angle, according to an embodiment of the present disclosure. Specifically, the plot 400 depicts optical reflectance versus wavelength of the plurality of alternating first and second polymeric layers 11, 12 for the s-polarized incident light 20 incident at the first incident angle of less than about 10 degrees. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

The plot 400 includes a curve 30 corresponding to the optical reflectance of the multilayer partial mirror 10 versus wavelength for the s-polarized incident light 20 incident at the first incident angle. In some cases, for the plot 400, the first incident angle is about 0 degree. The curve 30 may be interchangeably referred to as "the optical reflectance versus wavelength 30". Optical reflectance may be interchangeably referred to as "reflectance".

Referring to FIGS. 1, 3A, 3B and 4A, for the visible wavelength range 95, an infrared wavelength range 96 from about 800 nm to about 1300 nm, the incident light 20 propagating in the incident plane 22 that includes the x-direction, and for the first incident angle of less than about 10 degrees, the plurality of alternating first and second polymeric layers 11, 12 has an average reflectance Rs1 for the incident light 20 polarized along the y-direction. Specifically, for the visible wavelength range 95, the infrared wavelength range 96, the incident light 20 propagating in the incident plane 22 that includes the same in-plane first direction (i.e., x-direction), and at the first incident angle of less than about 10 degrees, the mirror 10 has the average reflectance Rs1 for the incident light 20 that is s-polarized. In other words, for the visible wavelength range 95, the infrared wavelength range 96, and the incident light 20 propagating in the incident plane 22 that includes the x-direction, and for the s-polarized incident light 20, the plurality of alternating first and second polymeric layers 11, 12 has the average reflectance Rs1 for the first incident angle of less than about 10 degrees.

In some embodiments, for the visible wavelength range 95, Rs1 is less than about 85%. In some embodiments, for the visible wavelength range 95, Rs1 is less than about 80%, less than about 75%, less than about 70%, or less than about 65%.

Further, in some embodiments, for the visible wavelength range 95, Rs1 is greater than about 50%. In some embodiments, for the visible wavelength range 95, Rs1 is greater than about 55%, greater than about 60%, greater than about 65%, or greater than about 70%. Therefore, in some embodiments, for the visible wavelength range 95, Rs1 is between about 50% and about 85%. In some examples, for the visible wavelength range 95, Rs1 is about 64% or about 71.7%.

Further, in some embodiments, for the infrared wavelength range 96, for the s-polarized incident light 20 propagating in the incident plane 22 that includes the x-direction, and the first incident angle, the plurality of alternating first and second polymeric layers 11, 12 has an average transmission Ts1 that is greater than about 50%. In some embodiments, for the infrared wavelength range 96, for the s-polarized incident light 20 propagating in the incident plane 22 that includes the x-direction, and the first incident angle, the plurality of alternating first and second polymeric layers 11, 12 has the average transmission Ts1 that is greater than about 60%, greater than about 70%, greater than about 75%, or greater than about 80%. In some examples, Ts1 is about 81% or about 83.7%.

Further, as depicted in the plot 400, the optical reflectance versus wavelength 30 for the first incident angle and for the s-polarized incident light 20, includes a reflection band edge 32 between about 760 nm and about 980 nm. In some embodiments, the optical reflectance versus wavelength 30 for the first incident angle and for the s-polarized incident light 20, includes the reflection band edge 32 between about 780 nm and about 960 nm, or between about 800 nm and about 940 nm.

Figure 4B:
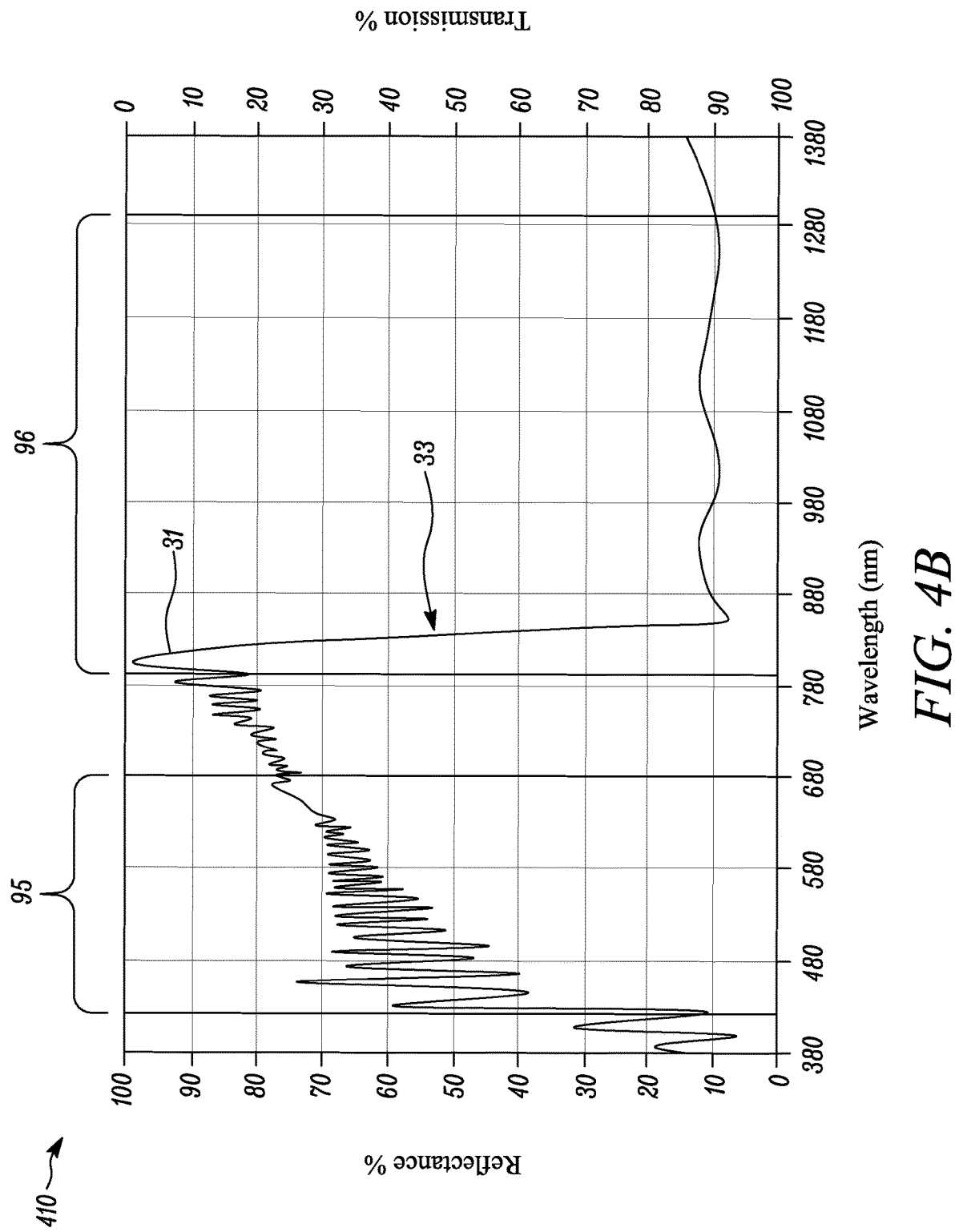
FIG. 4B illustrates a plot depicting optical reflectance versus wavelength of the multilayer partial mirror for a p-polarized incident light incident at the first incident angle, according to an embodiment of the present disclosure.

FIG. 4B illustrates a plot 410 depicting optical reflectance versus wavelength of the multilayer partial mirror 10 (shown in FIG. 1) for the p-polarized incident light 21 (shown in FIG. 3B) incident at the first incident angle, according to an embodiment of the present disclosure. Specifically, the plot 410 depicts optical reflectance versus wavelength of the plurality of alternating first and second polymeric layers 11, 12 for the p-polarized incident light 21 incident at the first incident angle of less than about 10 degrees. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

The plot 410 includes a curve 31 corresponding to the optical reflectance of the multilayer partial mirror 10 versus wavelength for the p-polarized incident light 21 incident at the first incident angle. In some cases, for the plot 410, the first incident angle is about 0 degree. The curve 31 may be interchangeably referred to as "the optical reflectance versus wavelength 31".

Referring to FIGS. 1, 3A, 3B and 4B, for the visible wavelength range 95, the infrared wavelength range 96, the incident light 21 propagating in the incident plane 22 that includes the x-direction, and for the first incident angle of less than about 10 degrees, the plurality of alternating first and second polymeric layers 11, 12 has an average reflectance Rp1 for the incident light 21 polarized along the x-direction. Specifically, for the visible wavelength range 95, the infrared wavelength range 96, and the incident light 21 propagating in the incident plane 22 that includes the same in-plane first direction, and at the first incident angle of less than about 10 degrees, the mirror 10 has the average reflectance Rp1 for the incident light 21 that is p-polarized. In other words, for the visible wavelength range 95, the infrared wavelength range 96, and the incident light 21 propagating in the incident plane 22 that includes the x-direction, and for the p-polarized incident light 21, the plurality of alternating first and second polymeric layers 11, 12 has the average reflectance Rp1 for the first incident angle.

In some embodiments, for the visible wavelength range 95, Rp1 is less than about 85%. In some embodiments, for the visible wavelength range 95, Rp1 is less than about 80%, less than about 75%, less than about 70%, or less than about 65%.

Further, in some embodiments, for the visible wavelength range 95, Rp1 is greater than about 50%. In some embodiments, for the visible wavelength range 95, Rp1 is greater than about 55%, greater than about 60%, greater than about 65%, or greater than about 70%. Therefore, in some embodiments, for the visible wavelength range 95, Rp1 is between about 50% and about 85%. In some examples, for the visible wavelength range 95, Rp1 is about 64% or about 71.7%.

Further, in some embodiments, for the infrared wavelength range 96, for the p-polarized incident light 21 propagating in the incident plane 22 that includes the x-direction, and the first incident angle, the plurality of alternating first and second polymeric layers 11, 12 has an average transmission Tp1 that is greater than about 50%. In some embodiments, for the infrared wavelength range 96, for the p-polarized incident light 21 propagating in the incident plane 22, and the first incident angle, the plurality of alternating first and second polymeric layers 11, 12 has the average transmission Tp1 that is greater than about 60%, greater than about 70%, greater than about 75%, or greater than about 80%. In some examples, Tp1 is about 81% or about 83.7%.

Further, as depicted in the plot 410, the optical reflectance versus wavelength 31 for the first incident angle and for the p-polarized incident light 21, includes a reflection band edge 33 between about 760 nm and about 980 nm. In some embodiments, the optical reflectance versus wavelength 31 for the first incident angle and for the p-polarized incident light 21, includes the reflection band edge 33 between about 780 nm and about 960 nm, or between about 800 nm and about 940 nm.

Referring now to FIGS. 4A and 4B, each of Rp1 and Rs1 is less than about 85% for the visible wavelength range 95. In some embodiments, each of Rp1 and Rs1 is less than about 80%, less than about 75%, less than about 70%, or less than about 65% for the visible wavelength range 95. Further, each of Rp1 and Rs1 is less than about 50% for the infrared wavelength range 96. In some embodiments, each of Rp1 and Rs1 is less than about 45%, less than about 35%, less than about 30%, or less than about 25% for the infrared wavelength range 96.

Therefore, for the infrared wavelength range 96, for each of the s-polarized incident light 20 and the p-polarized incident light 21, and the first incident angle, the plurality of alternating first and second polymeric layers 11, 12 may be substantially transmissive. Therefore, the multilayer partial mirror 10 may be suitable for IR fingerprint sensing applications.

In some embodiments, for the visible wavelength range 95, Rp1/Rs1 is between about 0.8 and about 1.2. In other words, for the visible wavelength range 95, a ratio of Rp1 to Rs1 is between about 0.8 and about 1.2. In some embodiments, for the visible wavelength range 95, Rp1/Rs1 is between about 0.85 and about 1.15, between about 0.90 and about 1.10, or between about 0.95 and about 1.05. In some examples, for the visible wavelength range 95, Rp1/Rs1 is about 1.

In some embodiments, for the visible wavelength range 95, Rp1 and Rs1 are within 10% of each other. In some embodiments, for the visible wavelength range 95, Rp1 and Rs1 are within 9%, within 8%, within 7%, within 6%, within 5%, within 4%, within 3%, or within 2% of each other.

Therefore, for the visible wavelength range 95, the plurality of alternating first and second polymeric layers 11, 12 may have a substantially similar average optical reflectance for each of the s-polarized incident light 20 and the p-polarized incident light 21, and the first incident angle.

The optical reflectance versus wavelength 31, 30, for each of the p- and s-polarized incident lights 21, 20, includes the reflection band edge 33, 31 between about 760 nm to and about 980 nm.

The reflection band edges 32, 33 of the respective optical reflectance versus wavelengths 30, 31 for the multilayer partial mirror 10 may be adjusted based on desired application attributes of the IR fingerprint sensing applications.

Figure 4C:
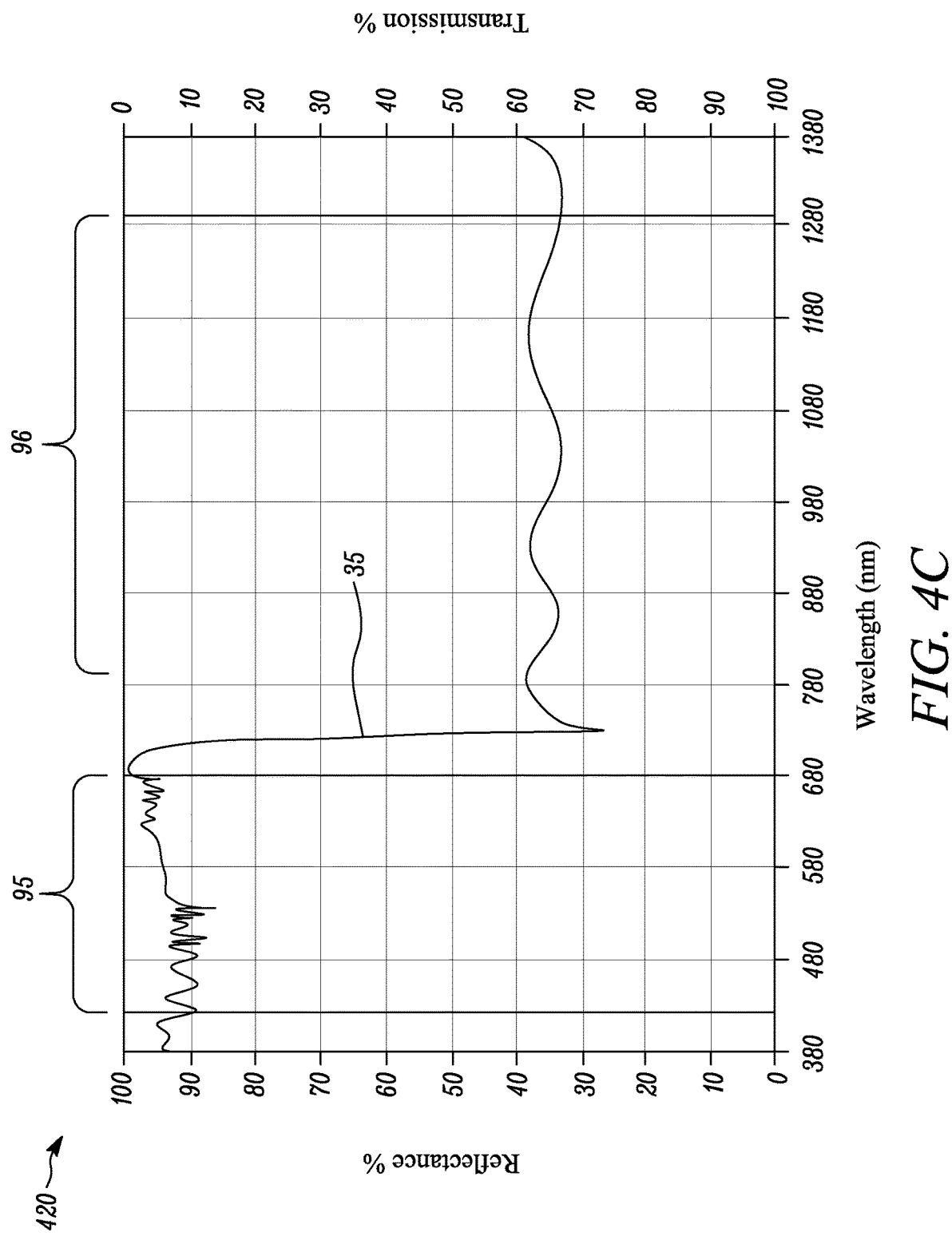
FIG. 4C illustrates a plot depicting optical reflectance versus wavelength of the multilayer partial mirror for an s-polarized incident light incident at a second incident angle, according to an embodiment of the present disclosure.

FIG. 4C illustrates a plot 420 depicting optical reflectance versus wavelength of the multilayer partial mirror 10 (shown in FIG. 1) for the s-polarized incident light 20 (shown in FIG. 3A) incident on the mirror 10 at the second incident angle, according to an embodiment of the present disclosure. Specifically, the plot 420 depicts optical reflectance versus wavelength of the plurality of alternating first and second polymeric layers 11, 12 for the s-polarized incident light 20 incident at the second incident angle of greater than about 45 degrees. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

The plot 420 includes a curve 35 corresponding to the optical reflectance of the multilayer partial mirror 10 versus wavelength for the s-polarized incident light 20 incident at the second incident angle. In some cases, for the plot 420, the second incident angle is about 60 degrees. The curve 35 may be interchangeably referred to as "the optical reflectance versus wavelength 35".

Referring to FIGS. 1, 3A, 3B and 4C, for the visible wavelength range 95, the infrared wavelength range 96, the incident light 20 propagating in the incident plane 22 that includes the x-direction, and for the second incident angle of greater than about 45 degrees, the plurality of alternating first and second polymeric layers 11, 12 has an average reflectance Rs2 for the incident light 20 polarized along the y-direction. Specifically, for the visible wavelength range 95, the infrared wavelength range 96, and the incident light 20 propagating in the incident plane 22, and for the s-polarized incident light 20, the plurality of alternating first and second polymeric layers 11, 12 has the average reflectance Rs2 for the second incident angle of greater than about 45 degrees.

In some embodiments, for the visible wavelength range 95, Rs2 is less than about 97%. In some embodiments, for the visible wavelength range 95, Rs2 is less than about 96%, less than about 95%, or less than about 94%.

Further, in some embodiments, for the visible wavelength range 95, Rs2 is greater than about 70%. In some embodiments, for the visible wavelength range 95, Rs2 is greater than about 75%, greater than about 80%, greater than about 85%, or greater than about 90%. Therefore, in some embodiments, for the visible wavelength range 95, Rs2 is between about 70% and about 97%. In some examples, Rs2 is about 92.4% or about 94.8%.

Further, in some embodiments, for the infrared wavelength range 96, for the s-polarized incident light 20 propagating in the incident plane 22 that includes the x-direction, and the second incident angle, the plurality of alternating first and second polymeric layers 11, 12 has an average transmission Ts2 that is greater than about 40%. In some embodiments, for the infrared wavelength range 96, for the s-polarized incident light 20 propagating in the incident plane 22, and the second incident angle, the plurality of alternating first and second polymeric layers 11, 12 has the average transmission Ts2 that is greater than about 45%, greater than about 50%, greater than about 55%, or greater than about 60%. In some examples, Ts2 is about 64.2% or about 64.6%.

Figure 4D:
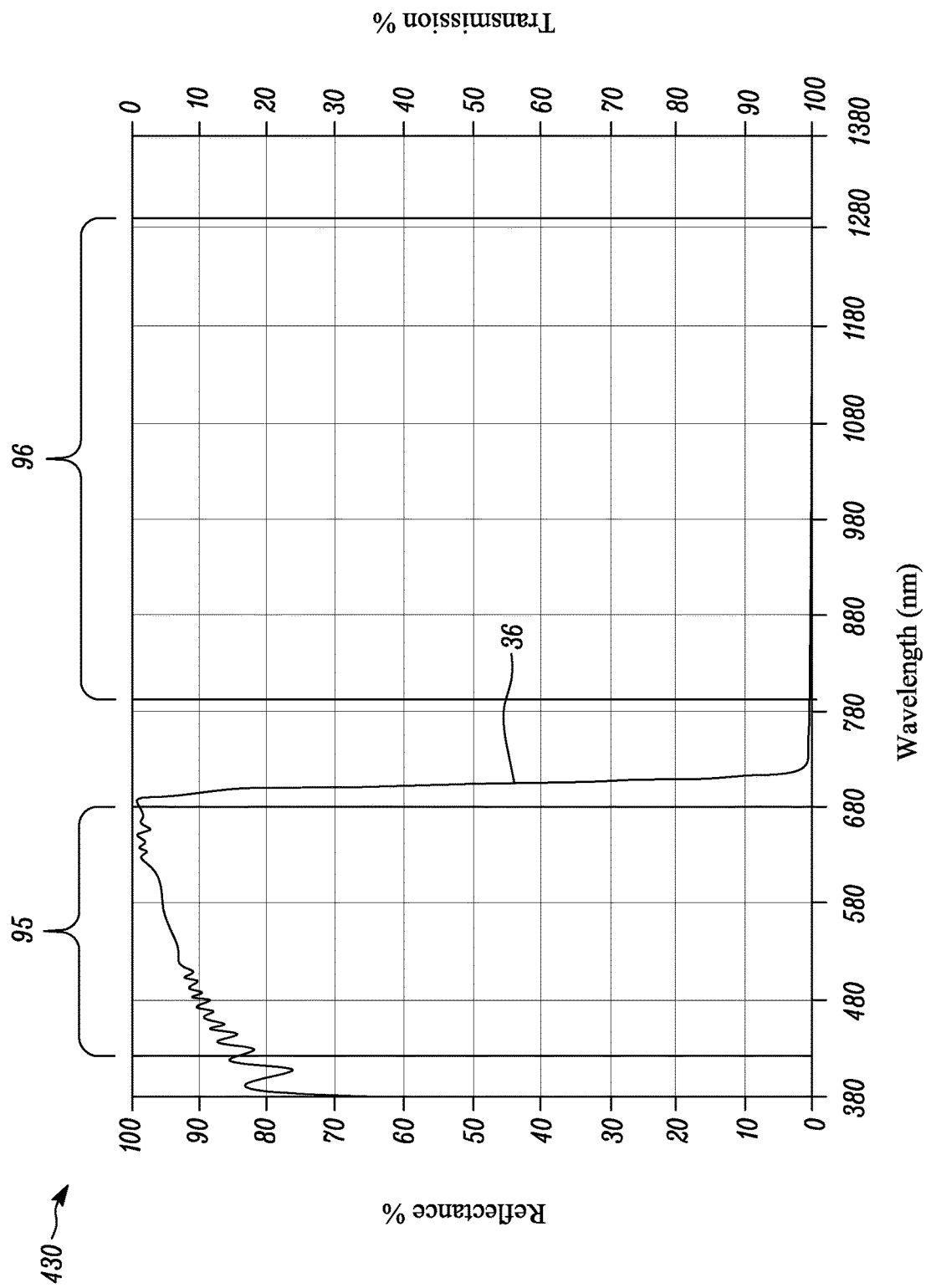
FIG. 4D illustrates a plot depicting optical reflectance versus wavelength of the multilayer partial mirror for a p-polarized incident light incident at the second incident angle, according to an embodiment of the present disclosure.

FIG. 4D illustrates a plot 430 depicting optical reflectance versus wavelength of the multilayer partial mirror 10 (shown in FIG. 1) for the p-polarized incident light 21 (shown in FIG. 3B) incident on the mirror 10 at the second incident angle, according to an embodiment of the present disclosure. Specifically, the plot 430 depicts optical reflectance versus wavelength of the plurality of alternating first and second polymeric layers 11, 12 for the p-polarized incident light 21 incident at the second incident angle of greater than about 45 degrees. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

The plot 430 includes a curve 36 corresponding to the optical reflectance of the multilayer partial mirror 10 versus wavelength for the p-polarized incident light 21 incident at the second incident angle. In some cases, for the plot 430, the second incident angle is about 60 degrees. The curve 36 may be interchangeably referred to as "the optical reflectance versus wavelength 36".

Referring to FIGS. 1, 3A, 3B and 4D, for the visible wavelength range 95, the infrared wavelength range 96, and the incident light 21 propagating in the incident plane 22 that includes the x-direction, and for the p-polarized incident light 21, the plurality of alternating first and second polymeric layers 11, 12 has an average reflectance Rp2 for the second incident angle.

In some embodiments, for the visible wavelength range 95, Rp2 is less than about 98%. In some embodiments, for the visible wavelength range 95, Rp2 is less than about 97%, less than about 96%, less than about 95%, less than about 94%, or less than about 93%.

Further, in some embodiments, for the visible wavelength range 95, Rp2 is greater than about 70%. In some embodiments, for the visible wavelength range 95, Rp2 is greater than about 75%, greater than about 80%, greater than about 85%, or greater than about 90%. Therefore, in some embodiments, for the visible wavelength range 95, Rp2 is between about 70% and about 98%. In some examples, for the visible wavelength range 95, Rp2 is about 93.3% or about 94.8%.

Further, in some embodiments, for the infrared wavelength range 96, for the p-polarized incident light 21 propagating in the incident plane 22 that includes the x-direction, and the second incident angle, the plurality of alternating first and second polymeric layers 11, 12 has an average transmission Tp2 that is greater than about 70%. In some embodiments, for the infrared wavelength range 96, for the p-polarized incident light 21 propagating in the incident plane 22, and the second incident angle, the plurality of alternating first and second polymeric layers 11, 12 has the average transmission Tp2 that is greater than about 75%, greater than about 80%, greater than about 85%, greater than about 90%, or greater than about 95%. In some examples, Tp2 is about 99.5% or about 99.7%.

Referring now to FIGS. 4C and 4D, for the visible wavelength range 95, the infrared wavelength range 96, the incident light 20, 21 propagating in the incident plane 22 that includes the x-direction, and for the second incident angle of greater than about 45 degrees, the plurality of alternating first and second polymeric layers 11, 12 has the average reflectances Rp2 and Rs2 for respective p- and s-polarized incident lights 20, 21. Further, each of Rp2 and Rs2 is greater than about 70% for the visible wavelength range 95. In some embodiments, each of Rp2 and Rs2 is greater than about 75%, greater than about 80%, greater than about 85%, or greater than about 90% for the visible wavelength range 95.

Therefore, for each of Rp2 and Rs2, and for the visible wavelength range 95, the mirror 10 may substantially reflect an off-axis light incident at an incident angle greater than about 45 degrees. Specifically, for the visible wavelength range 95, the mirror 10 may substantially reflect each of the s-polarized incident light 20 and the p-polarized incident light 21 and the second incident angle.

Referring now to FIGS. 4A-4D, for the visible wavelength range 95, each of Rs2/Rs1 and Rp2/Rp1 is greater than about 1.15. In some embodiments, for the visible wavelength range 95, each of Rs2/Rs1 and Rp2/Rp1 is greater than about 1.2, greater than about 1.25, greater than about 1.3, greater than about 1.35, greater than about 1.4, or greater than about 1.45.

Therefore, for the visible wavelength range 95, and for each of the s-polarized incident light 20 and the p-polarized incident light 21, the mirror 10 has a higher average optical reflectance for light incident at the second incident angle (i.e., an off-axis light) than for light incident at the first incident angle (i.e., substantially normally incident light or an on-axis light). In other words, for the visible wavelength range 95, and for each of the s-polarized incident light 20 and the p-polarized incident light 21, the mirror 10 has a greater optical transmittance for the on-axis light than for the off-axis light. Since, for the visible wavelength range 95, the mirror 10 may substantially collimate the off-axis light for both the s-polarized incident light 20 and the p-polarized incident light 21, the mirror 10 may provide an improved collimation than a conventional collimating film which typically reflects only one of an s-polarized light and a p-polarized light incident at the second incident angle. Further, for the visible wavelength range 95, the mirror 10 may have less average optical reflectance for the on-axis light as compared to the conventional collimating film which substantially blocks even the on-axis light polarized along one direction (one of the s-polarized light 20 and the p-polarized light 21). Thus, for the visible wavelength range 95, less average optical reflectance for the on-axis light may provide an improved axial luminance.

Further, for the infrared wavelength range 96, the plurality of alternating first and second polymeric layers 11, 12 are substantially transmissive for each of the s-polarized incident light 20 and the p-polarized incident light 21, incident at the first and second incident angles. In other words, the mirror 10 may be substantially transparent for the infrared wavelength range 96. Therefore, the mirror 10 may be suitable for the IR fingerprint sensing applications.

In some cases, a display system (not shown) for sensing a finger of a user may include the mirror 10 (shown in FIG. 1). An embodiment of such a display system may be described as herein. The display system may include a display panel configured to generate an image for viewing by the user and a backlight including a lightguide for providing an illumination to the display panel. The backlight may further include the mirror 10 disposed adjacent the lightguide opposite the display panel. The mirror 10 may function as a back reflector for the backlight and may function to recycle light from the lightguide towards the display panel. The display system may further include an optical construction disposed between the display panel and the lightguide, where the optical construction includes a reflective polarizer including a plurality of polymeric layers and having a first structured major surface disposed between the display panel and the plurality of polymeric layers. The display system may further include an infrared sensor disposed proximate the backlight and opposite the reflective polarizer. The display system may further include an infrared light source configured to emit an infrared light toward the display panel. The finger of the user may be placed on the display panel and a portion of the infrared light may be reflected from the finger and be transmitted through the backlight and the mirror 10, such that the infrared sensor may detect at least a portion of the infrared light transmitted through the mirror 10. In some cases, the display system may further include a structured mirror disposed between the mirror 10 and the infrared sensor, and including an optical mirror, and an array of discrete spaced apart optical bumps formed on the optical mirror and facing the lightguide. For a substantially normally incident light, the optical mirror may have an average optical reflectance of greater than about 30% in a visible wavelength range for at least a first polarization state, and a specular transmittance of greater than about 20% for at least one wavelength in an infrared wavelength range for each of the first polarization state and an orthogonal second polarization state.

Figure 5A:
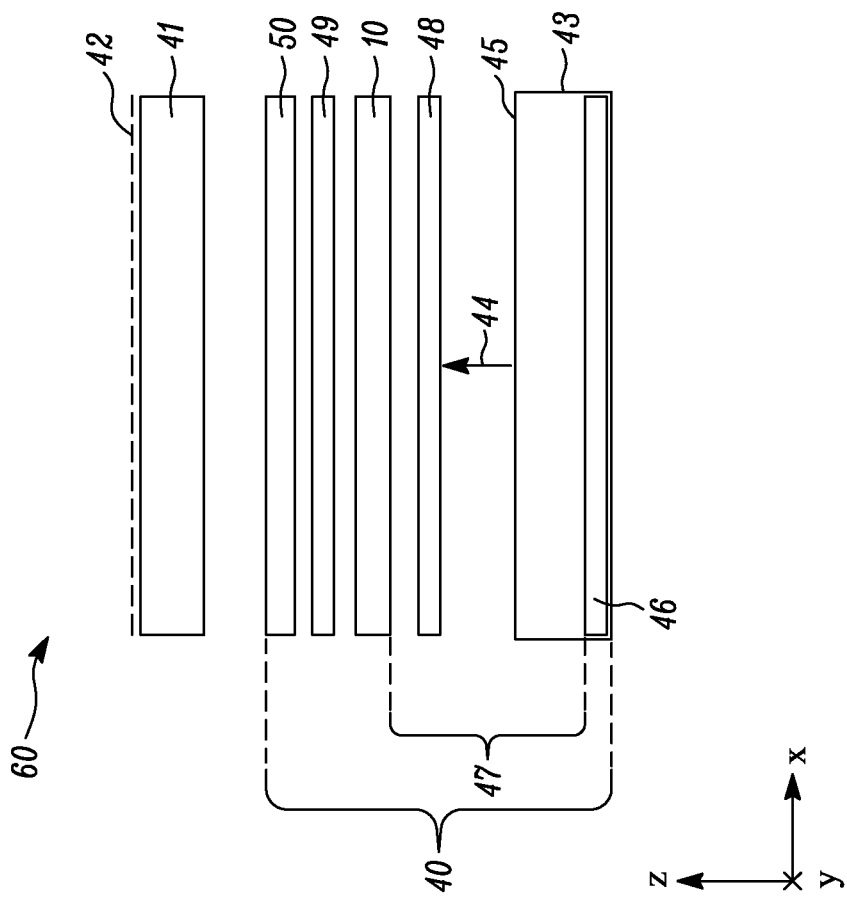
FIG. 5A illustrates a detailed schematic sectional view of a display system including the multilayer partial mirror, according to an embodiment of the present disclosure.

FIG. 5A illustrates a detailed schematic sectional view of a display system 60 including the mirror 10, according to an embodiment of the present disclosure. Specifically, the display system 60 includes a display panel 41 disposed on a backlight 40. The backlight 40 provides illumination to the display panel 41. The display panel 41 is configured to form an image 42.

In some embodiments, the display panel 41 includes a liquid crystal display (LCD) panel. The backlight 40 includes an extended light source 43 configured to emit a light 44 through an emission surface 45 thereof. The light 44 may be interchangeably referred to as "the emitted light 44".

The backlight 40 further includes the mirror 10. The mirror 10 is disposed on the emission surface 45. The mirror 10 and the back reflector 46 form a recycling optical cavity 47 therebetween.

The extended light source 43 further includes a back reflector 46. In some embodiments, the back reflector 46 may be highly reflective. For example, the back reflector 46 may have an on-axis average reflectivity of at least 90%, 95%, 98%, 99%, or more. Such reflectivity values may reduce the amount of loss in the recycling optical cavity 47. Further, such reflectivity values may include both specular and diffuse reflections. In some embodiments, the back reflector 46 may be a predominantly specular, diffuse, or combination specular/diffuse reflector, whether spatially uniform or patterned. In some embodiments, the back reflector 46 may be a semi-specular reflector. In some cases, the back reflector 46 may include a stiff metal substrate with a high reflectivity coating, or a high reflectivity film laminated to a supporting substrate. In some embodiments, the back reflector 46 may include one or more elements, such as silver, aluminum, a white coating, a non-conductive coating, etc.

The mirror 10 is configured to receive the emitted light 44. The mirror 10 is further configured to transmit a portion of the received light therethrough. In other words, the mirror 10 is configured to receive the emitted light 44 incident on the mirror 10, and a light exiting the mirror 10 includes the portion of the emitted light 44 transmitted through the mirror 10.

In some embodiments, the backlight 40 further includes a first optical diffuser 48 disposed between the mirror 10 and the emission surface 45. The first optical diffuser 48 diffuses the light 44 emitted by the extended light source 43.

In some embodiments, the backlight 40 further includes a second optical diffuser 49. The second optical diffuser 49 is disposed on the mirror 10 opposite the emission surface 45. The second optical diffuser 49 is configured to diffuse the light transmitted by the mirror 10.

Each of first and second optical diffusers 48, 49 may include any suitable diffuser film or plate configured to diffuse or scatter light. For example, the first and second optical diffusers 48, 49 may diffuse light through use of a textured surface of a substrate, or through other means such as incorporation of light diffusing particles within a matrix of the film.

In some embodiments, the backlight 40 further includes a reflective polarizer 50 disposed on the mirror 10, opposite the emission surface 45. In the illustrated embodiment of FIG. 5A, the reflective polarizer 50 is disposed adjacent to the second optical diffuser 49, such that the second optical diffuser 49 is located between the mirror 10 and the reflective polarizer 50. Therefore, in the illustrated embodiment of FIG. 5A, the reflective polarizer 50 is arranged to receive the transmitted light diffused by the second optical diffuser 49.

In some embodiments, the reflective polarizer 50 may be a collimating multilayer optical film (CMOF). However, the reflective polarizer 50 may be any suitable reflective polarizer. In some embodiments, the reflective polarizer 50 may include one or more of a multilayer polymeric reflective polarizer, a wire grid reflective polarizer, and a diffuse reflective polarizer. Reflective polarizers rely on the difference in refractive index between at least two materials, usually polymeric materials, to selectively reflect light of one polarization state while transmitting light in an orthogonal polarization state.

Figure 5B:
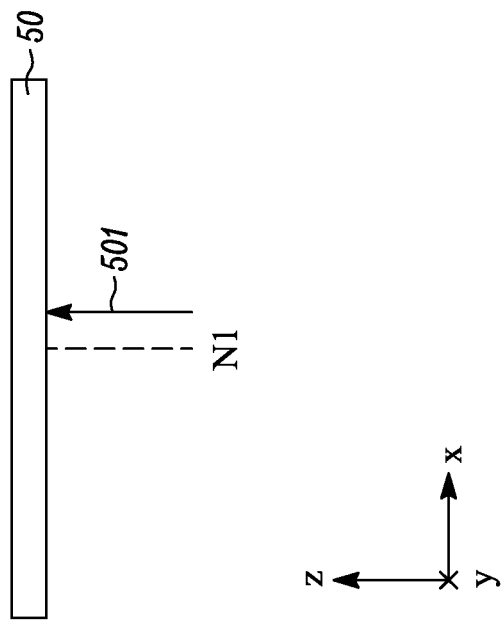
FIG. 5B illustrates a schematic view of a reflective polarizer of the display system, according to an embodiment of the present disclosure.

FIG. 5B illustrates a schematic view of the reflective polarizer 50 of the display system 60 shown in FIG. 5A, according to an embodiment of the present disclosure. FIG. 5B further illustrates a substantially normally incident light 501 incident on the reflective polarizer 50, i.e., the substantially normally incident light 501 is incident at an angle of about 0 degree with respect to a normal N1 to the reflective polarizer 50.

In some embodiments, the normal N1 may be substantially parallel to the normal N (shown in FIGS. 3A and 3B). The substantially normally incident light 501 may be interchangeably referred to as "the incident light 501".

In some cases, the incident light 501 may be polarized along a first direction. In some embodiments, the first direction may be the x-direction. Further, in some other cases, the incident light 501 may be polarized along a second direction orthogonal to the first direction. In some embodiments, the second direction may be the y-direction.

Figure 5C:
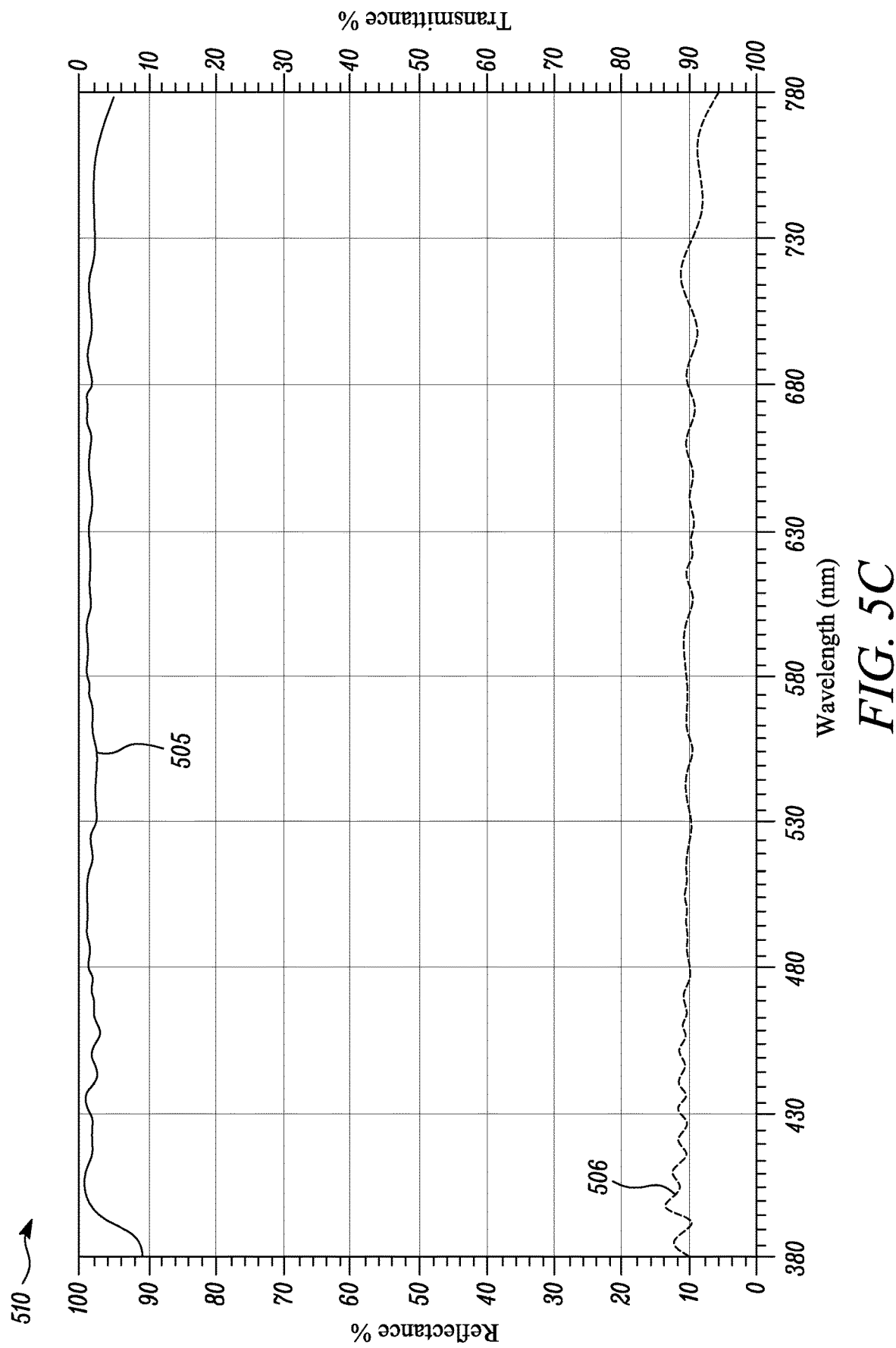
FIG. 5C illustrates a plot depicting optical characteristics of the reflective polarizer of FIG. 5B, according to an embodiment of the present disclosure.

FIG. 5C illustrates a plot 510 depicting optical characteristics of the reflective polarizer 50, according to an embodiment of the present disclosure. Specifically, the plot 510 depicts an optical reflectance and an optical transmission of the reflective polarizer 50. Wavelength is expressed in nanometers (nm) in the abscissa. Optical reflectance is expressed as a reflectance percentage in the left ordinate axis. Optical transmittance is expressed as a transmittance percentage on the right ordinate axis.

Transmission percentage is approximated to be complementary to the reflectance percentage, i.e., transmission percentage=(100−reflectance percentage).

Referring now to FIGS. 5B and 5C, the plot 510 includes a reflectance curve 505. The reflectance curve 505 depicts the optical reflectance of the reflective polarizer 50 for the substantially normally incident light 501 that is polarized along the first direction.

The plot 510 further includes a reflectance curve 506. The reflectance curve 506 depicts the optical transmittance of the reflective polarizer 50 for the substantially normally incident light 501 that is polarized along the second direction orthogonal to the first direction.

As depicted by the reflectance curve 505, for the visible wavelength range 95 and the substantially normally incident light 501, the reflective polarizer 50 has an average optical reflectance of greater than about 60% when the incident light 501 is polarized along the first direction. In some embodiments, for the visible wavelength range 95 and the substantially normally incident light 501, the reflective polarizer 50 has the average optical reflectance of greater than about 70%, greater than about 80%, or greater than about 90% when the incident light 501 is polarized along the first direction.

As depicted by the reflectance curve 506, for the visible wavelength range 95 and the substantially normally incident light 501, the reflective polarizer 50 has an average optical transmittance of greater than about 60% when the incident light 501 is polarized along the second direction orthogonal to the first direction. In some embodiments, for the visible wavelength range 95 and the substantially normally incident light 501, the reflective polarizer 50 has the average optical transmittance of greater than about 70%, greater than about 80%, or greater than about 90% when the incident light 501 is polarized along the second direction orthogonal to the first direction.

Figure 6B:
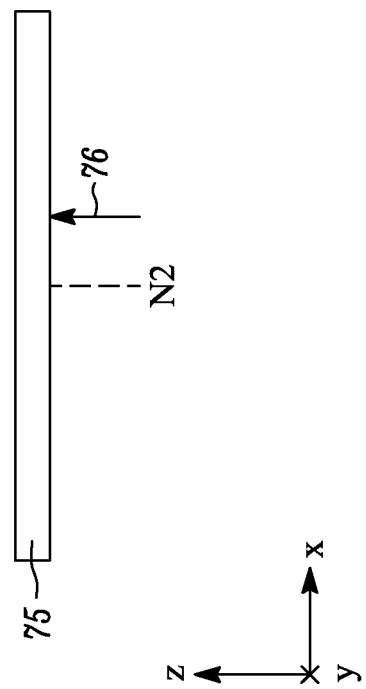
FIG. 6B illustrates a schematic view of a reflective polarizer of the optical system of FIG. 6A, according to an embodiment of the present disclosure.
Figure 6A:
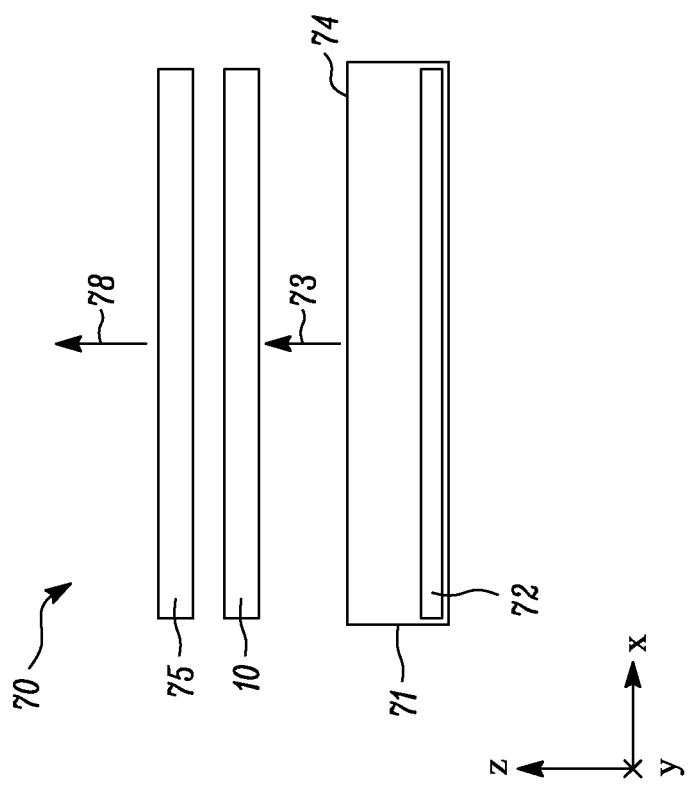
FIG. 6A illustrates a detailed schematic sectional view of an optical system including the multilayer partial mirror, according to an embodiment of the present disclosure.

FIG. 6A illustrates a detailed schematic sectional view of an optical system 70, according to an embodiment of the present disclosure. In some embodiments, the optical system 70 is formed by providing a substantially Lambertian light source 71 that includes a back reflector 72 and emits substantially unpolarized light 73 through an extended emission surface 74 thereof.

A Lambertian light source is an optical source that obeys Lambert's cosine law, $I=I_0 \cos \alpha$, where $\alpha$ is a viewing angle, and $I_0$ is a light intensity at the viewing angle $\alpha$ of about 0 degree, i.e., normal to the light source. For the Lambertian light source, the light intensity at a viewing angle $\alpha$ close to 90 degrees is very low. Light emitting diodes (LEDs) approximate Lambertian sources as they tend to have a large beam divergence and a radiation pattern that approximates a sphere. In some cases, the Lambertian light source may be achieved by providing a non-Lambertian light source with an out-coupling photometric diffuser (e.g., of or including acetal, silicon dioxide, etc.) proximate to the non-Lambertian light source to achieve a Lambertian or Lambertian-like effect.

In some embodiments, the back reflector 72 has a total reflectance of greater than about 90% at at least one wavelength in the visible wavelength range 95. In some embodiments, the back reflector 72 has a total reflectance of greater than about 92%, greater than about 94%, greater than about 96%, greater than about 98%, or greater than about 99% at at least one wavelength in the visible wavelength range 95. The optical system 70 is further formed by disposing the mirror 10 between a reflective polarizer 75 and the emission surface 74.

A light 78 exits the optical system 70. The light 78 may exit the optical system 70 through the reflective polarizer 75.

In some embodiments, the back reflector 72 may be substantially similar to the back reflector 46 of FIG. 5A.

FIG. 6B illustrates a schematic view of the reflective polarizer 75 of the optical system 70, according to an embodiment of the present disclosure. FIG. 6B further illustrates a substantially normally incident light 76 incident on the reflective polarizer 75, i.e., the substantially normally incident light 76 is incident at angle of about 0 degree with respect to a normal N2 to the reflective polarizer 75. In some embodiments, the normal N2 may be substantially parallel to the normal N (shown in FIGS. 3A and 3B). The substantially normally incident light 76 may be interchangeably referred to as "the incident light 76".

In some cases, the incident light 76 may be polarized along a first direction. In some embodiments, the first direction may be the x-direction. Further, in some cases, the incident light 76 may be polarized along a second direction orthogonal to the first direction. In some embodiments, the second direction may be the y-direction. In some cases, the incident light 76 may be a partially polarized light. Further, in some cases, the incident light 76 may an unpolarized light having an unknown or arbitrary polarization state or a distribution of polarization states.

In some embodiments, the reflective polarizer 75 may be substantially similar to the reflective polarizer 50 (shown in FIGS. 5A and 5B). Specifically, the optical characteristics of the reflective polarizer 75 may be substantially similar to the optical characteristics of the reflective polarizer 50, as shown in the plot 510 (shown in FIG. 5C). Thus, in some embodiments, for the visible wavelength range 95 and the substantially normally incident light 76, the reflective polarizer 75 has an average optical reflectance of greater than about 60% when the incident light 76 is polarized along the x-direction. In some embodiments, for the visible wavelength range 95 and the substantially normally incident light 76, the reflective polarizer 75 has the average optical reflectance of greater than about 70%, greater than about 80%, or greater than about 90% when the incident light 76 is polarized along the x-direction.

Further, for the visible wavelength range 95 and the substantially normally incident light 76, the reflective polarizer 75 has an average optical transmittance of greater than about 60% when the incident light 76 is polarized along the y-direction. In some embodiments, for the visible wavelength range 95 and the substantially normally incident light 76, the reflective polarizer 75 has the average optical transmittance of greater than about 70%, greater than about 80%, or greater than about 90% when the incident light 76 is polarized along the y-direction.

Figure 6C:
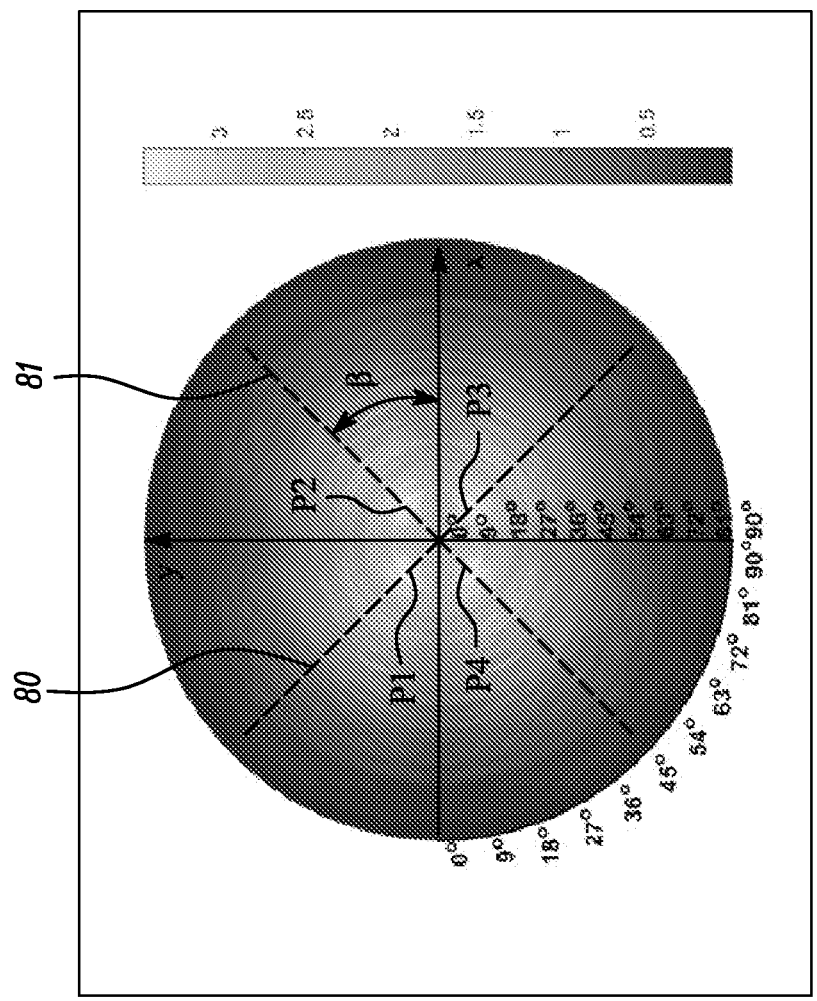
FIG. 6C illustrates a luminous distribution of a light exiting the optical system of FIG. 6A, according to an embodiment of the present disclosure.

FIG. 6C illustrates a luminous distribution 77 of the light 78 (shown in FIG. 6A) exiting the optical system 70 (shown in FIG. 6A), according to an embodiment of the present disclosure.

Figure 6D:
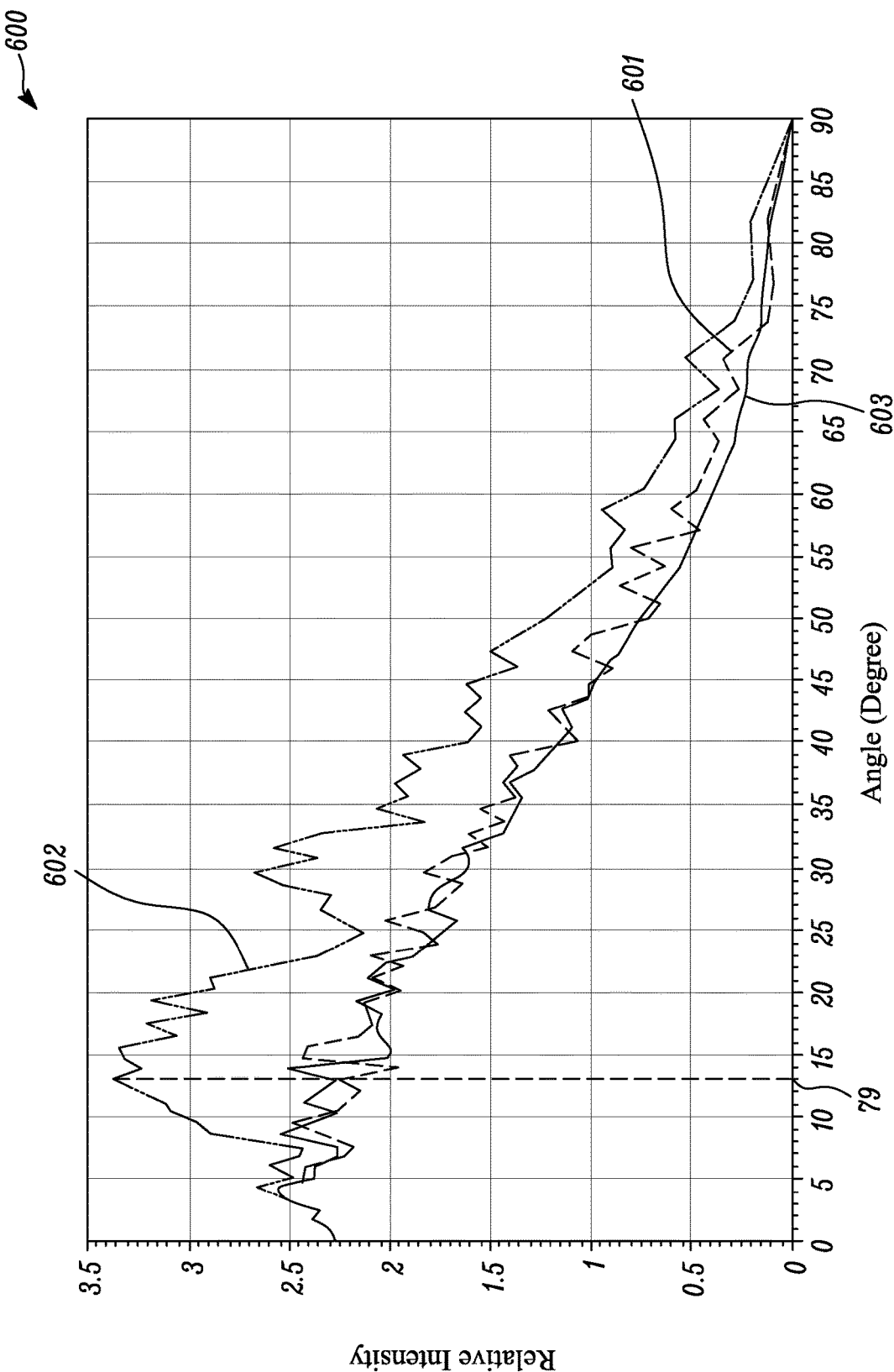
FIG. 6D illustrates a plot of relative intensity of the light exiting the optical system of FIG. 6A, according to an embodiment of the present disclosure.

FIG. 6D illustrates a plot 600 of a relative intensity of the light 78 (shown in FIG. 6A) exiting the optical system 70 (shown in FIG. 6A), when observed at different angles with respect to the z-direction, according to an embodiment of the present disclosure. Specifically, the plot 600 depicts the relative intensity of the light 78 on the left ordinate, and the different angles with respect to the z-direction in degrees on the abscissa. The plot 600 includes an intensity curve 601, an intensity curve 602 and an intensity curve 603 depicting relative intensity of the light 78 exiting the optical system 70.

Referring now to FIGS. 6A-6D, the luminous distribution 77 of the light 78 exiting the optical system 70 through the reflective polarizer 75 includes at least one global peak at an angle 79 with a line normal (i.e., the normal N2) to the reflective polarizer 75. In some embodiments, at least one global peak is at the angle 79 of greater than about 5 degrees with the line normal to the reflective polarizer 75. In some embodiments, the line normal with the reflective polarizer 75 is along the z-direction. Therefore, the luminous distribution 77 of the light 78 exiting the optical system 70 through the reflective polarizer 75 includes the at least one global peak at the angle 79 of greater than about 5 degrees with respect to the z-direction of the reflective polarizer 75. In the illustrated embodiment of FIG. 6D, the angle 79 is about 13 degrees. In some embodiments, the luminous distribution 77 of the light 78 exiting the optical system 70 through the reflective polarizer 75 includes the at least one global peak at the angle 79 of greater than about 7 degrees, greater than about 10 degrees, or greater than about 12 degrees with the line normal to the reflective polarizer 75.

In some embodiments, the at least one global peak lies in a plane that makes an oblique angle 3 with the x-direction. In some embodiments, the oblique angle D is between about 30 degrees and about 60 degrees. In some embodiments, the oblique angle D is between about 35 degrees and about 55 degrees, or between about 40 degrees and about 50 degrees. In the illustrated embodiment of FIG. 6C, the oblique angle D is about 45 degrees. The luminous distribution 77 of the light 78 includes four global peaks at the angle 79 of greater than about 5 degrees with the line normal to the reflective polarizer 75. Specifically, the luminous distribution 77 includes a first global peak P1, a second global peak P2, a third global peak P3, and a fourth global peak P4. The first and third global peaks P1, P3 lie on a plane 80 making the oblique angle β with the x-direction. The second and fourth global peaks P2 and P4 lie on a plane 81 making the oblique angle D with the x-direction.

Referring now to FIGS. 6A-6D, the intensity curves 601, 602 and 603 depict a variation or distribution of the light 78 exiting the optical system 70 at the oblique angle D of 0 degree, 45 degrees and 90 degrees, respectively. From the plot 600 of FIG. 6D, it can be observed that the curve 602 includes a peak value of the relative intensity of the light 78 exiting the optical system 70. Further, it can be observed that the peak value is at the angle 79 greater than about 5 degrees with respect to the z-direction. This corresponds to a location of the at least one global peak in the luminous distribution 77.

In some embodiments, the first global peak P1, the second global peak P2, the third global peak P3, and the fourth global peak P4 may have substantially similar relative intensities.

EXAMPLES AND DATA

The multilayer partial mirror ("the mirror 10") of the present disclosure was constructed and compared with a conventional collimating multilayer optical film (CMOF). The CMOF included a plurality of first and second layers, and first and second skin layers. The CMOF included 650 layers.

Table 1 below provides refractive indices of the different layers of the CMOF.

TABLE 1

| Layer | nx | ny | nz |
|---|---|---|---|
| First Layers | 1.840 | 1.625 | 1.490 |
| Second Layers | 1.570 | 1.570 | 1.570 |
| First Skin Layer | 1.570 | 1.570 | 1.570 |
| Second Skin Layer | 1.570 | 1.570 | 1.570 |

The mirror was constructed similar to a construction of the mirror 10, as described in FIG. 1. The mirror included 420 layers.

Table 2 below provides exemplary refractive indices of the different layers of the mirror.

TABLE 2

| Layer | nx | ny | nz |
|---|---|---|---|
| First Polymeric Layers | 1.690 | 1.695 | 1.510 |
| Second Polymeric Layers | 1.620 | 1.620 | 1.620 |
| First Polymeric Skin Layer | 1.620 | 1.620 | 1.620 |
| Second Polymeric Skin Layer | 1.620 | 1.620 | 1.620 |

The mirror was constructed using alternating high index optical (HIO) and low index optical (LIO) films. The HIO and LIO films included polymer materials including polyhexylethylene naphthalate (PHEN) copolymers, polyethylene terephthalate (PET), and blends thereof. The materials for the HIO and LIO films were chosen according to a desired refractive index along the x-, y-, and z-directions. A series of PHEN copolymers were produced using the following components—dimethyl naphthalenedicarboxylate (NDC), hexanediol (HD), ethylene glycol (EG), cobalt acetate (CoAc), and tetrabutyle titanate (TBT). The components were added to a room temperature stainless steel 10-gallon reactor equipped with a hot oil temperature control, an overhead separation column, and a vacuum pump, and were heated and mixed at about 125 revolutions per minute (rpm), under a pressure of about 138 kilo Pascal (kPa) in a nitrogen atmosphere. A transesterification reaction was driven over a course of about 2 hours, at a temperature of about 257 degree Celsius (° C.). Methanol generated during the reaction was driven off through the separation column and collected in a receiver. Once the reaction was complete, the pressure in the reactor was gradually bled to atmospheric value, and thereafter, a vacuum was applied to the reactor and increased as much as batch viscosity allowed. Any excess EG was driven off. After about 2 hours at a temperature of about 285° C., and a vacuum as of about 1 millimeter (mm) of mercury (Hg), the reaction progressed to the desired endpoint. The desired endpoint may be equivalent to about 0.48 decilitre per gram (dL/g) viscosity for PEN. The reactor was then drained, and the resin was allowed to cool, and was further ground up into small pieces. The molar % of HD was determined. By varying the proportion of the components used for the reaction, five batches of example PHEN copolymers (PHEN 30, PHEN 35, PHEN 40, PHEN 50 and PHEN 70) were prepared. PHEN30, for example, had 30 mol % HD.

Table 3 below provides exemplary component proportions used for the five batches of PHEN.

TABLE 3

|  | PHEN 30 | PHEN 35 | PHEN 40 | PHEN 50 | PHEN 70 |
|---|---|---|---|---|---|
| NDC (#) | 40 | 40 | 40 | 40 | 40 |
| HD (#) | 5.81 | 6.78 | 7.74 | 9.68 | 13.55 |
| EG (#) | 20.33 | 19.83 | 19.32 | 18.30 | 16.27 |
| CoAc (g) | 2.72 | 2.72 | 2.72 | 2.72 | 2.72 |
| TBT (g) | 0.91 | 1.36 | 1.36 | 1.29 | 1.73 |

A series of bilayer films were produced using the example PHEN copolymers. A first extruder was made to feed the series of PHEN copolymers, and a second extruder was made to feed a 0.64 IV polyester resin. The materials were extruded and cast on a chill roll for producing 24 mil cast web films. The cast web films were biaxially oriented at a ratio of 350%×350% of the original film dimensions. Stretching was conducted at about 100° C. to about 105° C. with a pre-heat time of about 45 seconds (s). The oriented films were then annealed for at about 225° C. for about 15 s. The refractive index of top layer of each of the oriented films was measured.

Table 4 below provides the refractive indices of the oriented films along x-, y-, and z-directions (nx, ny, nz, respectively).

TABLE 4

|  | nx | ny | nz |
|---|---|---|---|
| PHEN 30 | 1.6985 | 1.6985 | 1.552 |
| PHEN 35 | 1.6395 | 1.6395 | 1.622 |
| PHEN 40 | 1.629 | 1.629 | 1.624 |
| PHEN 50 | 1.628 | 1.628 | 1.626 |
| PHEN 70 | 1.625 | 1.625 | 1.623 |

The results suggested 40% HD or higher was suitable for an isotropic LIO film.

PHEN copolymers were further blended with different levels of PET. They were cast into films, and stretched, oriented and annealed. The refractive index of top layer of each of the oriented films was measured.

Table 5 below provides the refractive indices of the oriented films along x-, y-, and z-directions (nx, ny, nz, respectively) for blends of PHEN 40 with different levels of PET.

TABLE 5

| PET (wt %) | nx | ny | nz |
|---|---|---|---|
| 0 | 1.629 | 1.629 | 1.624 |
| 20 | 1.617 | 1.617 | 1.614 |
| 40 | 1.6065 | 1.6065 | 1.605 |
| 50 | 1.6045 | 1.6045 | 1.602 |
| 60 | 1.6225 | 1.6225 | 1.577 |
| 70 | 1.61 | 1.61 | 1.607 |
| 80 | 1.646 | 1.646 | 1.529 |

Based on the desired refractive index for HIO and LIO layers (e.g., film of Table 2), PHEN or PHEN blended with PET copolymers were chosen.

Three samples A, B, C of the mirror of the present disclosure were constructed, each having different thickness profiles.

Figure 7A:
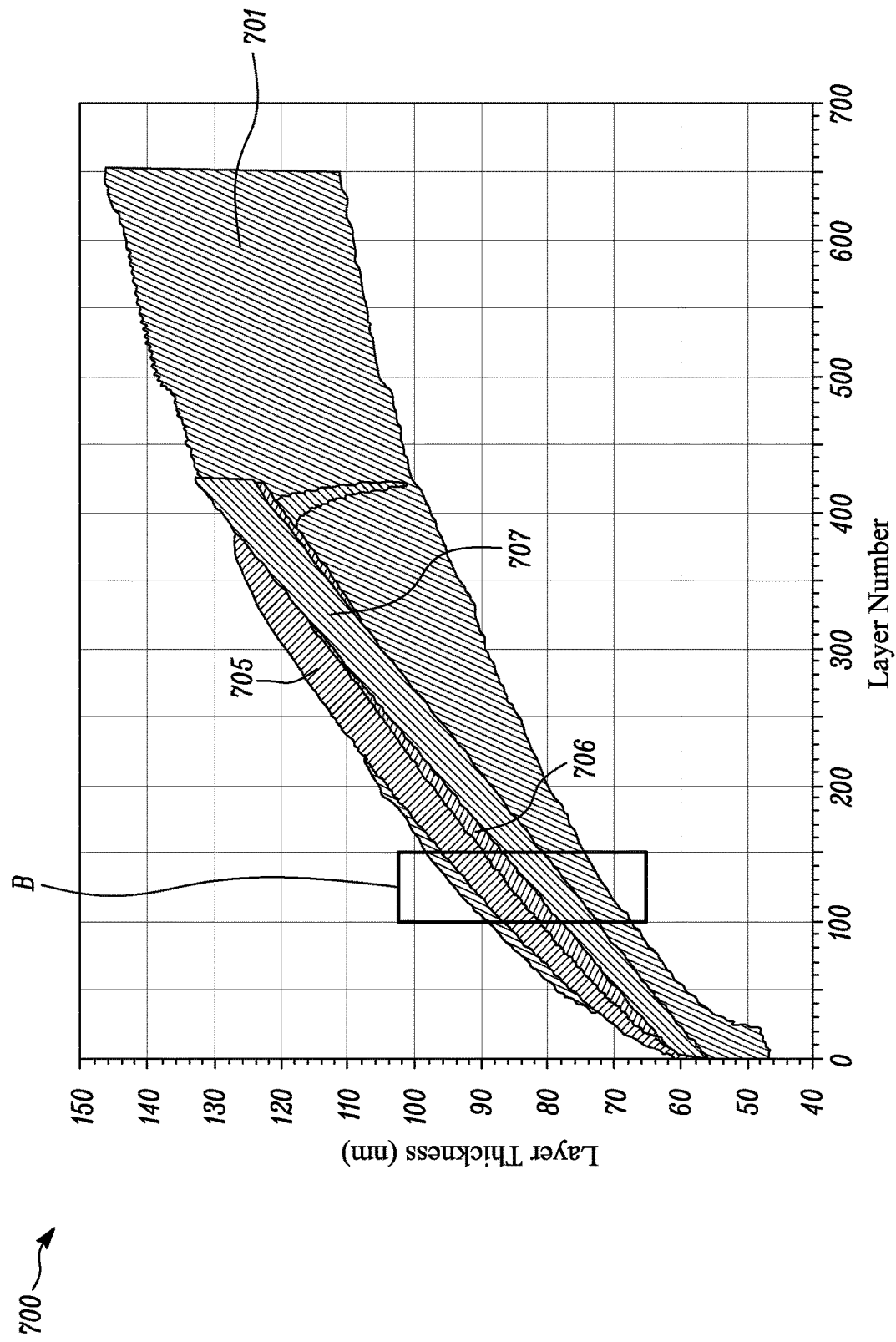
FIG. 7A illustrates an exemplary plot of layer thicknesses of a conventional collimating multilayer optical film (CMOF) and samples A, B, and C.
Figure 7B:
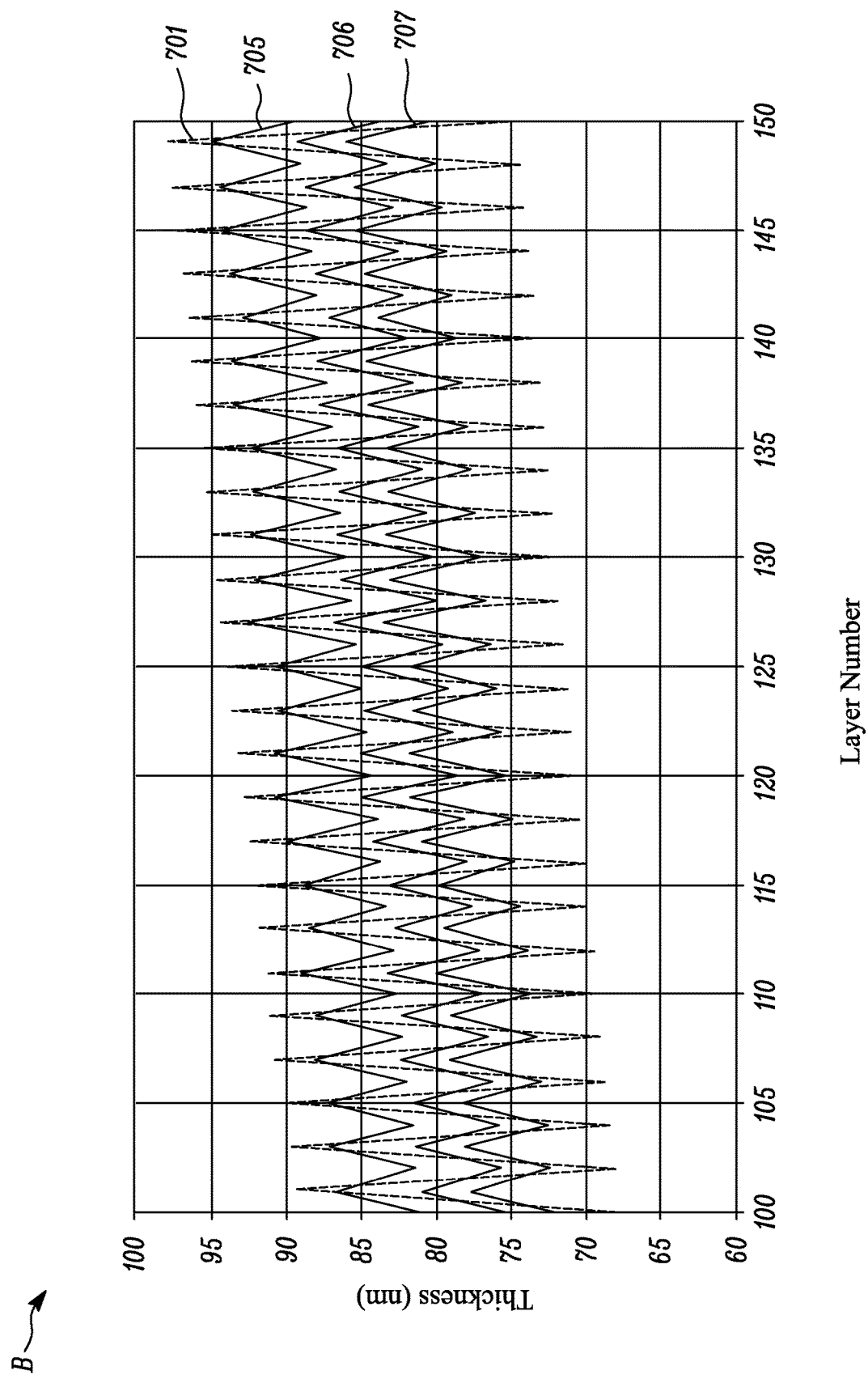
FIG. 7B illustrates an enlarged view of a portion of the exemplary plot of FIG. 7A.

FIG. 7A illustrates an exemplary plot 700 depicting variation in layer thicknesses of the different layers of the CMOF and samples A, B, C. Sample A is substantially similar to "the mirror 10" of the present disclosure. The thickness is depicted in nanometers (nm) in the ordinate axis, and the layer number is depicted on the abscissa. The plot 700 includes a thickness curve 701 depicting the variation in thickness of adjacent layers of the CMOF. The plot 700 further includes thickness curves 705, 706, 707 depicting the variation in thickness of adjacent layers of the samples A, B, C, respectively. FIG. 7B further illustrates an enlarged view of a portion B of the plot 700.

Table 6 provides exemplary thickness profiles of the CMOF and the samples A, B, C.

TABLE 6

|  | CMOF | Sample A | Sample B | Sample C |
|---|---|---|---|---|
| Difference between maximum and minimum thicknesses of the first and second polymeric layers | 64.1% | 54.5% | 57.6% | 57.4% |
| Maximum difference between thicknesses of adjacent polymeric layers | 31.1% | 10.1% | 6.6% | 6.6% |

Referring to FIGS. 7A and 7B, for the CMOF, the maximum thickness and the minimum thickness of the first and second layers was 131.2 nm and 47.1 nm, respectively. Therefore, for the CMOF, the difference between the maximum thickness and the minimum thickness of the first and second layers was about 64.1%. Further, for the CMOF, a maximum difference between thicknesses of the first and second layers was about 31.1%. The difference in thicknesses of the first and second layers of the CMOF is best illustrated in FIG. 7B.

For the sample A, the maximum thickness and the minimum thickness of the first and second layers was 126.7 nm and 57.6 nm, respectively. Therefore, for the sample A, the difference between the maximum thickness and the minimum thickness of the first and second layers was about 54.5%. Further, for the sample A, a maximum difference between thicknesses of the first and second layers was about 10.1%. The difference in thicknesses of the first and second layers of the sample A is best illustrated in FIG. 7B.

For the sample B, the maximum thickness and the minimum thickness of the first and second layers was 131.1 nm and 55.6 nm, respectively. Therefore, for the sample B, the difference between the maximum thickness and the minimum thickness of the first and second layers was about 57.6%. Further, for the sample B, a maximum difference between thicknesses of the first and second layers was about 6.6%. The difference in thicknesses of the first and second layers of the sample B is best illustrated in FIG. 7B.

For the sample C, the maximum thickness and the minimum thickness of the first and second layers was 132.2 nm and 56.3 nm, respectively. Therefore, for the sample C, the difference between the maximum thickness and the minimum thickness of the first and second layers was about 57.4%. Further, for the sample C, a maximum difference between thicknesses of the first and second layers was about 6.6%. The difference in thicknesses of the first and second layers of the sample C is best illustrated in FIG. 7B.

Referring FIGS. 7A and 7B it was observed that each of the curves 701, 705, 706, 707 has multiple V-shaped segments indicating respective values of thickness of the first and second layers. Peaks and valleys of the V-shaped segments represent thicknesses of individual layers.

It was observed that a variation of the thickness curves 705, 706, 707 (corresponding to the samples A, B, C, respectively) was comparable to each other, while the variation the thickness curve 701 (corresponding to the CMOF) was greater than that of the thickness curves 705, 706, 707. This implied that the variation in thickness between adjacent layers of the CMOF was larger than the variation in thickness between adjacent layers of the samples A, B, C.

Figure 8A:
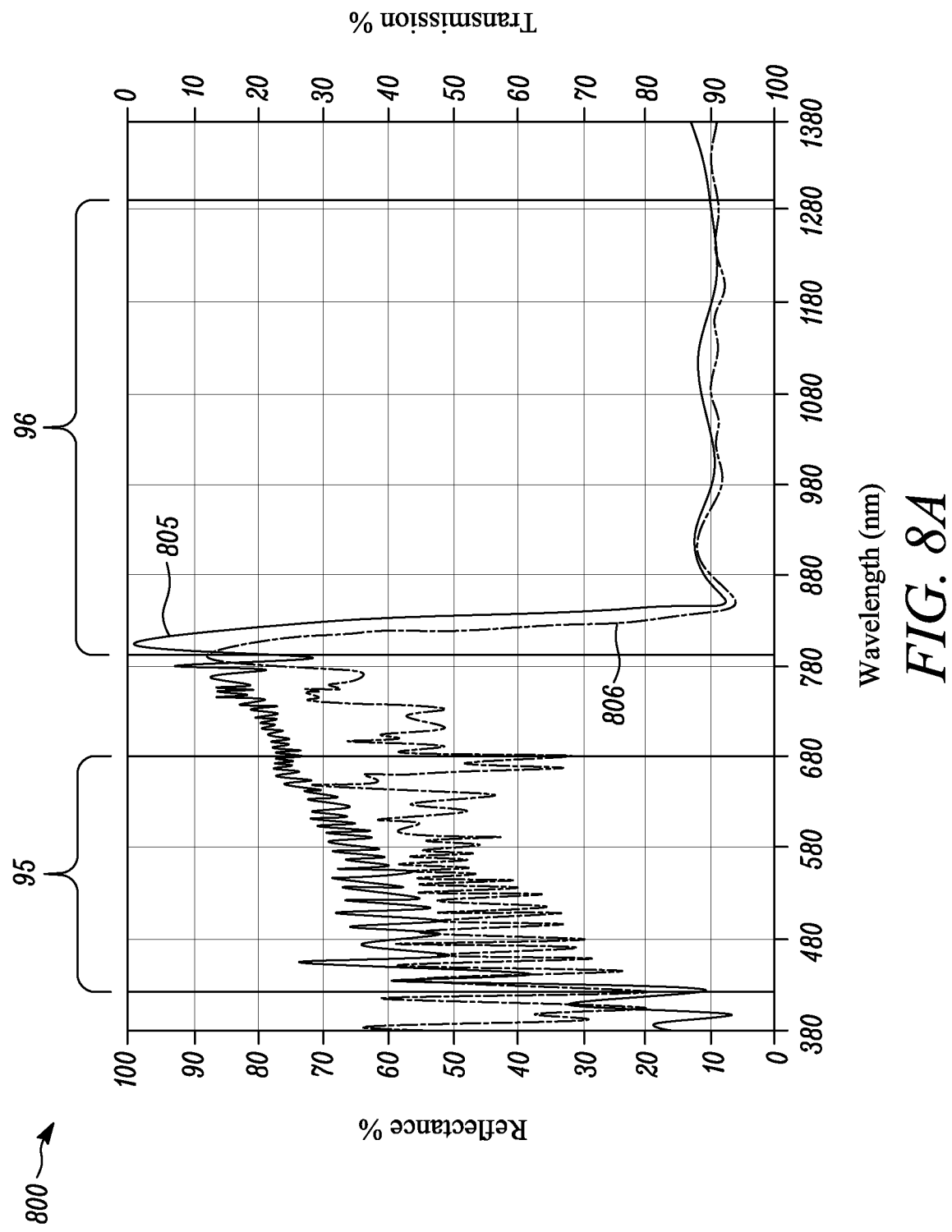
FIG. 8A illustrates an exemplary plot depicting optical reflectance versus wavelength of the sample A and the CMOF for an s-polarized incident light incident at a first incident angle.

FIG. 8A illustrates an exemplary plot 800 of optical characteristics of the sample A and the CMOF. Referring to FIGS. 1, 3A, 3B and 8A, the plot 800 includes a reflectance curve 805 depicting optical reflectance versus wavelength of the sample A for an s-polarized light incident at the first incident angle of less than about 10 degrees. Further, the plot 800 includes a reflectance curve 806 depicting optical reflectance versus wavelength of the CMOF for the s-polarized light incident at the first incident angle of less than about 10 degrees. The s-polarized light may be a light polarized along a second direction (e.g., the y-direction) orthogonal to a first direction (e.g., the x-direction). In this example, the s-polarized incident light may be incident on respective mirror-environment interfaces of the CMOF and the sample A, where an external environment may include air. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 805, for the s-polarized incident light propagating in the incident plane 22 (shown in FIG. 3A) that includes the first direction, and for the first incident angle of less than about 10 degrees, the plurality of alternating first and second polymeric layers of the sample A had an average optical reflectance of about 64% in the visible wavelength range 95, and an average optical transmission of about 84% in the infrared wavelength range 96.

As depicted by the reflectance curve 806, for the s-polarized incident light propagating in a same incident plane 22 that includes the first direction, and for the first incident angle of less than about 10 degrees, the plurality of alternating first and second layers of the CMOF had an average optical reflectance of about 48% in the visible wavelength range 95, and an average transmission of about 88% in the infrared wavelength range 96.

Figure 8B:
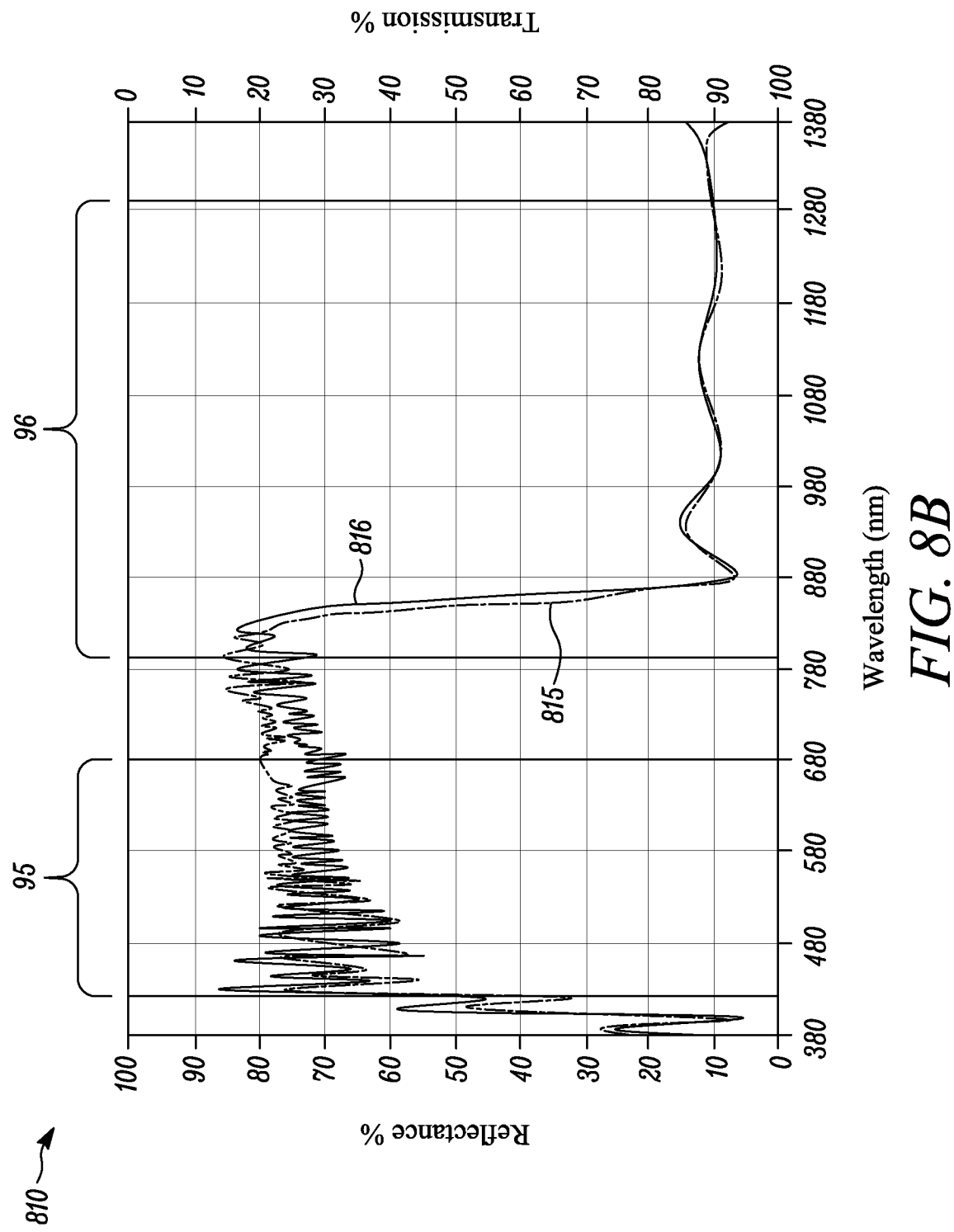
FIG. 8B illustrates an exemplary plot depicting optical reflectance versus wavelength of the samples B and C for an s-polarized incident light incident at the first incident angle.

FIG. 8B illustrates an exemplary plot 810 of optical characteristics of the samples B and C. The plot 810 includes reflectance curves 815, 816 depicting optical reflectance versus wavelength of the samples B and C, respectively, for the s-polarized light incident at the first incident angle of less than about 10 degrees. In this example, the s-polarized incident light may be incident on respective mirror-environment interfaces of the samples B and C. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 815, for the s-polarized incident light propagating in the incident plane 22 (shown in FIG. 1) that includes the first direction, and for the first incident angle of less than about 10 degrees, the plurality of alternating first and second polymeric layers of the sample B had an average optical reflectance of about 71% in the visible wavelength range 95, and an average optical transmission of about 82% in the infrared wavelength range 96.

As depicted by the reflectance curve 816, for the s-polarized incident light propagating in the incident plane 22 that includes the first direction, and for the first incident angle of less than about 10 degrees, the plurality of alternating first and second polymeric layers of the sample C had an average optical reflectance of about 72% in the visible wavelength range 95, and an average optical transmission of about 81% in the infrared wavelength range 96.

Figure 9A:
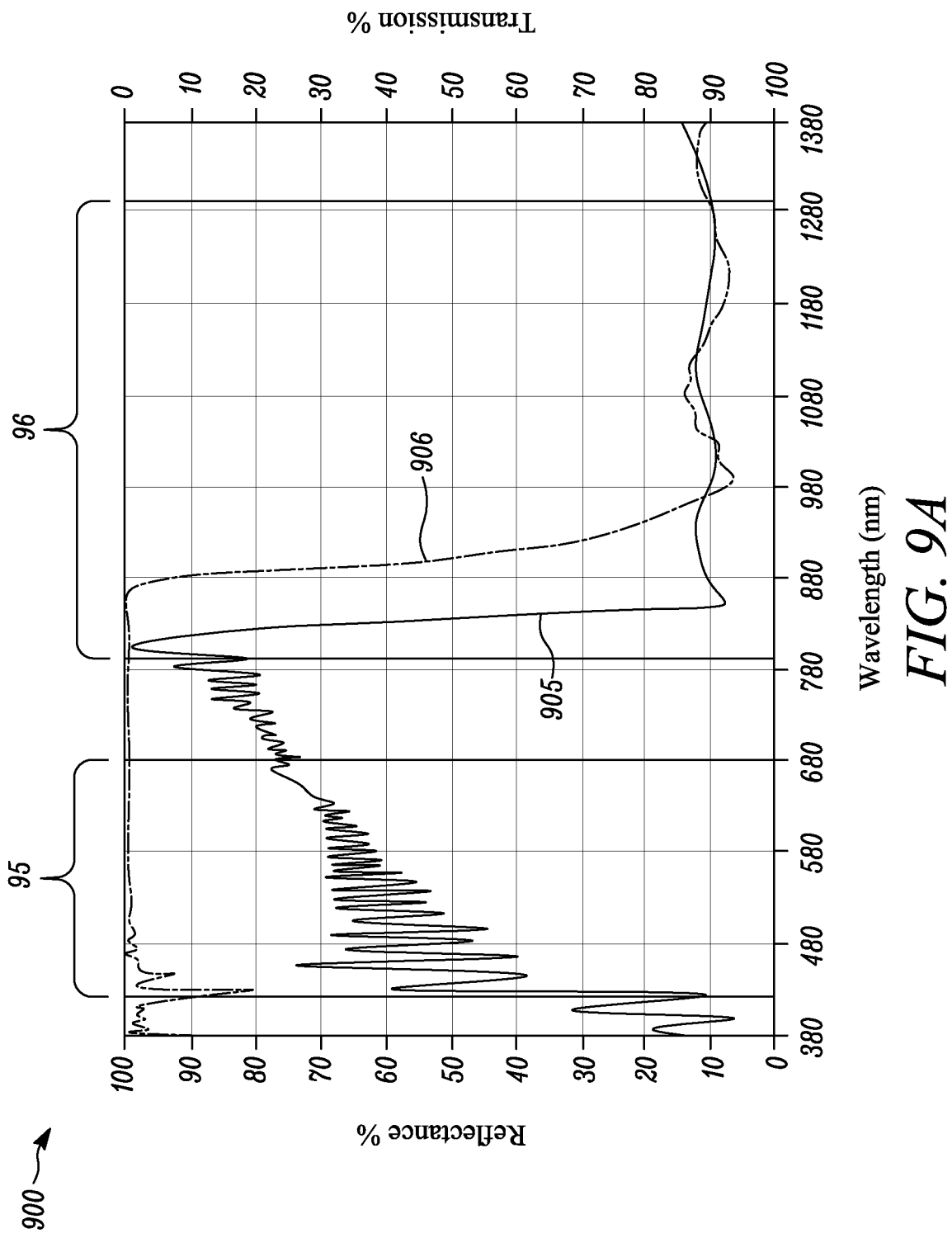
FIG. 9A illustrates another exemplary plot depicting optical reflectance versus wavelength of the sample A and the CMOF for a p-polarized incident light incident at the first incident angle.

FIG. 9A illustrates an exemplary plot 900 of optical characteristics of the sample A and the CMOF. The plot 900 includes a reflectance curve 905 depicting optical reflectance versus wavelength of the sample A for a p-polarized light incident at the first incident angle of less than about 10 degrees. Further, the plot 900 includes a reflectance curve 906 depicting optical reflectance versus wavelength of the CMOF for the p-polarized light incident at the first incident angle of less than about 10 degrees. The p-polarized light incident at the first incident angle of less than about 10 degrees may be a light polarized along the first direction. In this example, the p-polarized incident light may be incident on respective mirror-environment interfaces of the CMOF and the sample A, where an external environment may include air. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 905, for the p-polarized incident light propagating in the incident plane 22 (shown in FIG. 3B) that includes the first direction, and for the first incident angle of less than about 10 degrees, the plurality of alternating first and second polymeric layers of the sample A had an average optical reflectance of about 64% in the visible wavelength range 95, and an average optical transmission of greater than about 84% in the infrared wavelength range 96.

As depicted by the reflectance curve 906, for the p-polarized incident light propagating in the same incident plane 22 that includes the first direction, and for the first incident angle of less than about 10 degrees, the plurality of alternating first and second layers of the CMOF had an average optical reflectance of about 98% in the visible wavelength range 95, and an average transmission of about 71% in the infrared wavelength range 96.

Figure 9B:
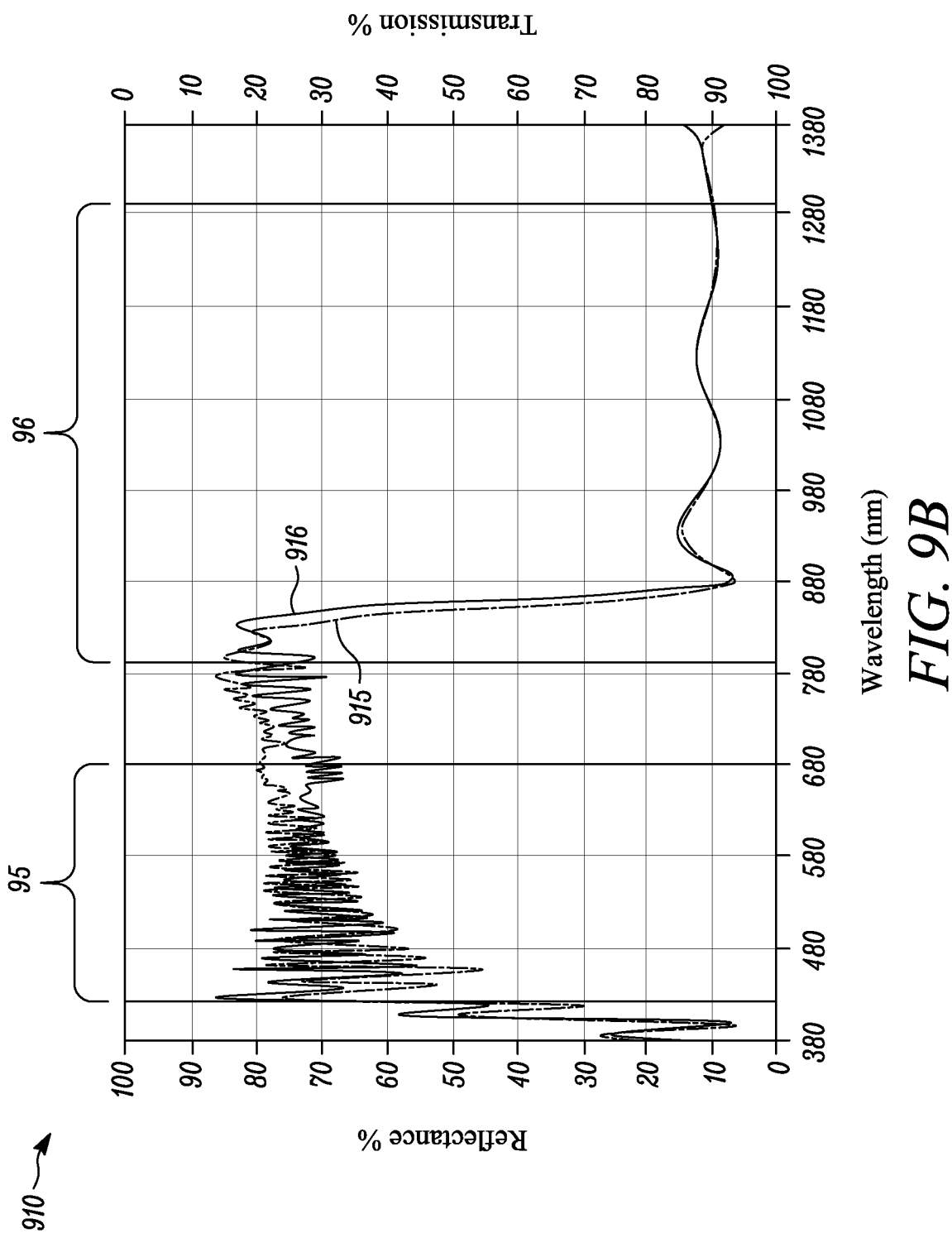
FIG. 9B illustrates another exemplary plot depicting optical reflectance versus wavelength of the samples B and C versus wavelength for a p-polarized incident light incident at the first incident angle.

FIG. 9B illustrates an exemplary plot 910 of optical characteristics of the samples B and C. The plot 910 includes reflectance curves 915, 916 depicting optical reflectance versus wavelength of the samples B and C, respectively, for the p-polarized light incident at the first incident angle of less than about 10 degrees. In this example, the p-polarized incident light may be incident on respective mirror-environment interfaces of the samples B and C, where an external environment may include air. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 915, for the p-polarized incident light propagating in the incident plane 22

(shown in FIG. 3B) that includes the first direction, and for the first incident angle of less than about 10 degrees, the plurality of alternating first and second polymeric layers of the sample B had an average optical reflectance of about 71% in the visible wavelength range 95, and an average optical transmission of about 82% in the infrared wavelength range 96.

As depicted by the reflectance curve 916, for the p-polarized incident light propagating in the incident plane 22 that includes the first direction, and for the first incident angle of less than about 10 degrees, the plurality of alternating first and second polymeric layers of the sample C had an average optical reflectance of about 72% in the visible wavelength range 95, and an average optical transmission of about 81% in the infrared wavelength range 96.

As is apparent from FIGS. 8A-9B, for the visible wavelength range, the CMOF substantially transmitted the s-polarized light incident at the first incident angle while substantially blocking the p-polarized light incident at the first incident angle. On the other hand, each of the samples A, B and C substantially transmitted the s-polarized light and the p-polarized light incident at the first incident angle. Therefore, for the visible wavelength range, each of the samples A, B and C had less average optical reflectance for the on-axis light as compared to the CMOF. For the visible wavelength range, less average optical reflectance for the on-axis light provided an improved axial luminance.

Figure 10A:
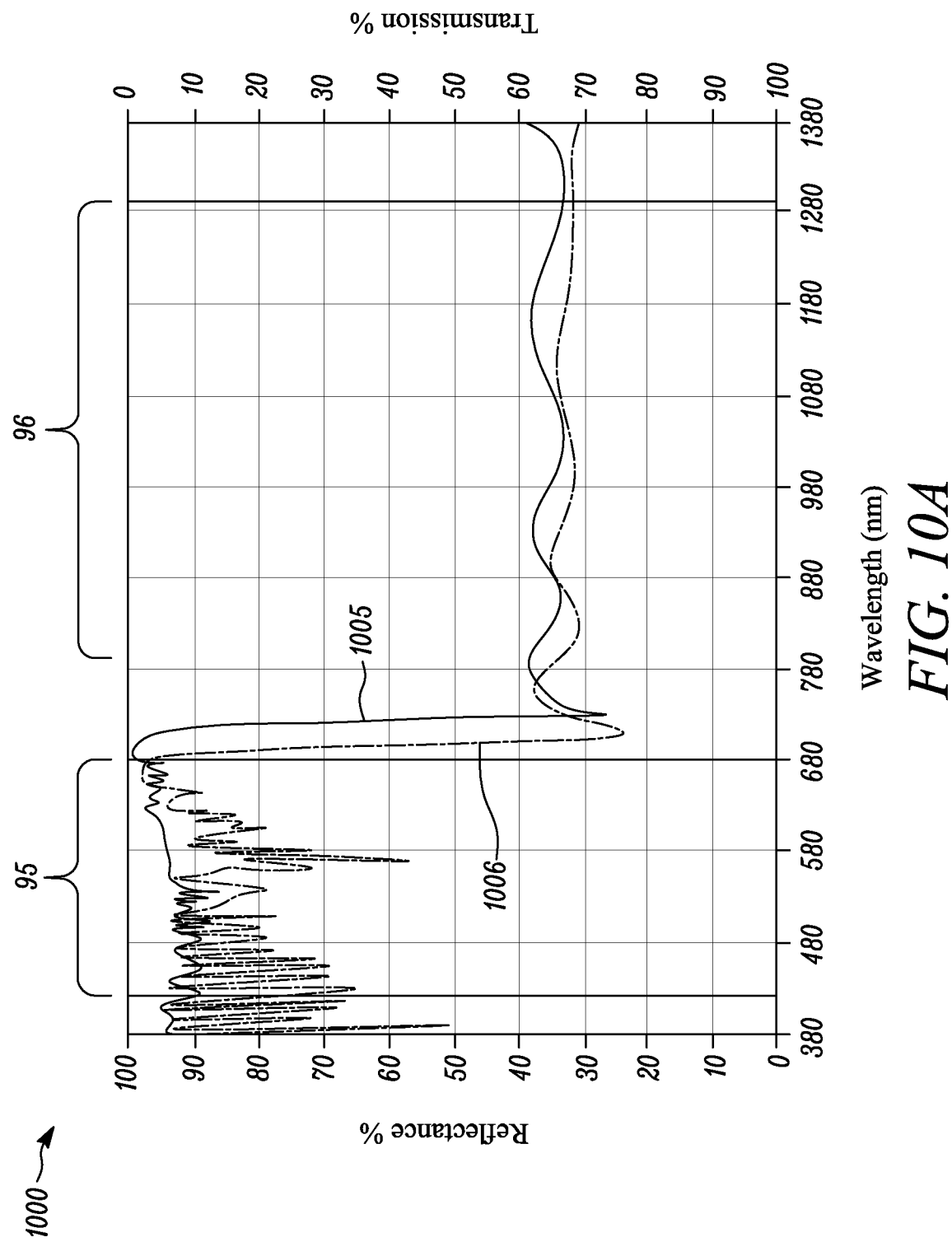
FIG. 10A illustrates another exemplary plot depicting optical reflectance versus wavelength of the sample A and the CMOF versus wavelength for an s-polarized incident light incident at a second incident angle.

FIG. 10A illustrates an exemplary plot 1000 of optical characteristics of the sample A and the CMOF. The plot 1000 includes a reflectance curve 1005 depicting optical reflectance versus wavelength of the sample A for an s-polarized light incident at the second incident angle of greater than about 45 degrees. Further, the plot 1000 includes a reflectance curve 1006 depicting optical reflectance versus wavelength of the CMOF for the s-polarized light incident at the second incident angle of greater than about 45 degrees. The s-polarized light may be a light polarized along the second direction. In this example, the s-polarized incident light may be incident on the respective mirror-environment interfaces of the CMOF and the sample A. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 1005, for the s-polarized incident light propagating in the incident plane 22 (shown in FIG. 3A) that includes the first direction, and for the second incident angle of greater than about 45 degrees, the plurality of alternating first and second polymeric layers of the sample A had an average optical reflectance of about 92% in the visible wavelength range 95, and an average optical transmission of about 65% in the infrared wavelength range 96.

As depicted by the reflectance curve 1006, for the s-polarized incident light propagating in the incident plane 22 that includes the first direction, and for the second incident angle of greater than about 45 degrees, the plurality of alternating first and second layers of the CMOF had an average optical reflectance of about 86% in the visible wavelength range 95, and an average optical transmission of about 67% in the infrared wavelength range 96.

Figure 10B:
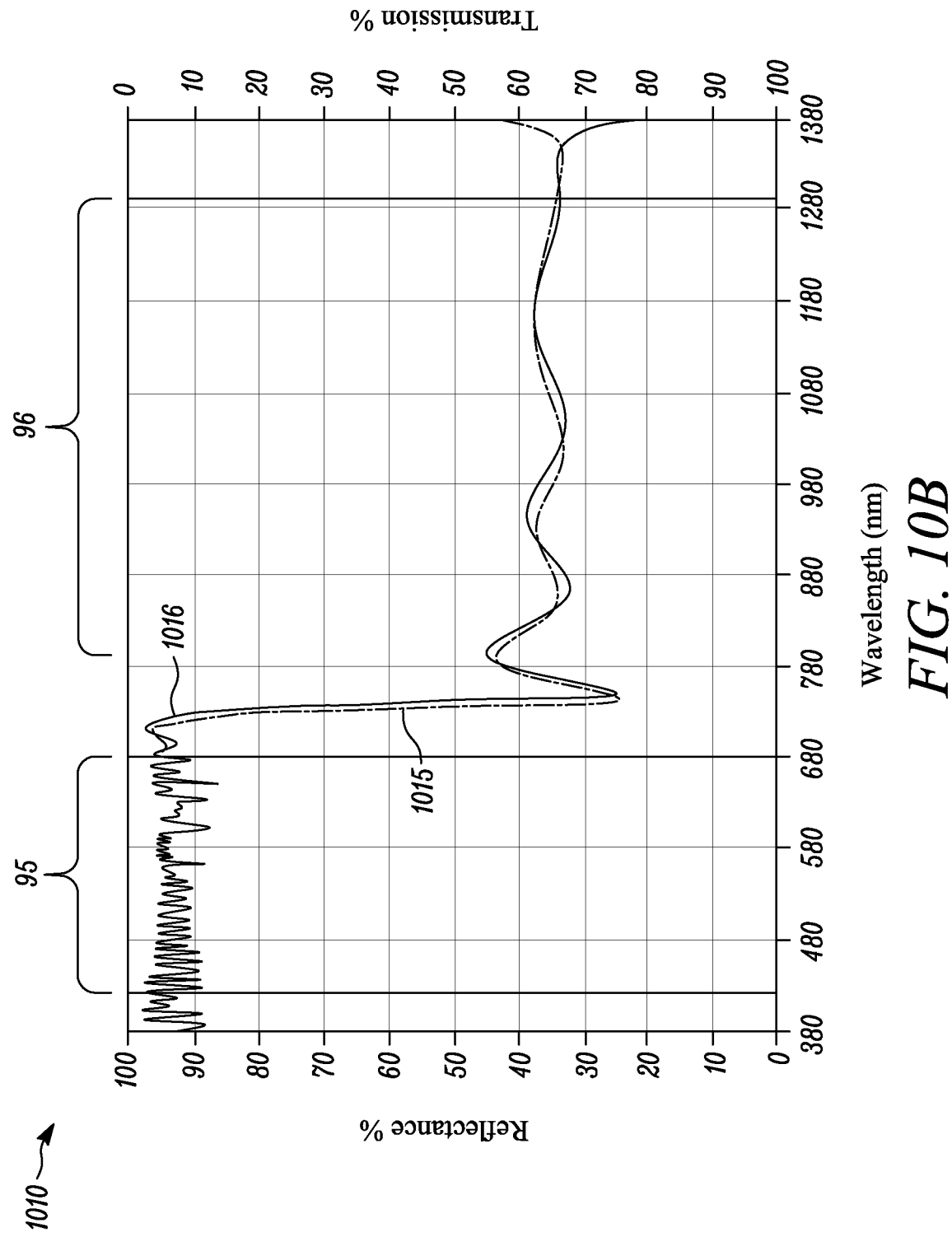
FIG. 10B illustrates another exemplary plot depicting optical reflectance versus wavelength of the samples B and C for an s-polarized incident light incident at the second incident angle.

FIG. 10B illustrates an exemplary plot 1010 of optical characteristics of the samples B and C. The plot 910 includes reflectance curves 1015, 1016 depicting optical reflectance versus wavelength of the samples B and C, respectively, for the s-polarized light incident at the second incident angle of greater than about 45 degrees. In this example, the s-polarized incident light may be incident on respective mirror-environment interfaces of the samples B and C. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 1015, for the s-polarized incident light propagating in the incident plane 22 (shown in FIG. 3A) that includes the first direction, and for the second incident angle of greater than about 45 degrees, the plurality of alternating first and second polymeric layers of the sample B had an average optical reflectance of about 94% and in the visible wavelength range 95, and an average optical transmission of about 64% in the infrared wavelength range 96.

As depicted by the reflectance curve 1016, for the s-polarized incident light propagating in the incident plane 22 that includes the first direction, and for the second incident angle of greater than about 45 degrees, the plurality of alternating first and second polymeric layers of the sample C had an average optical reflectance of about 93% and in the visible wavelength range 95, and an average optical transmission of about 64% in the infrared wavelength range 96.

Figure 11A:
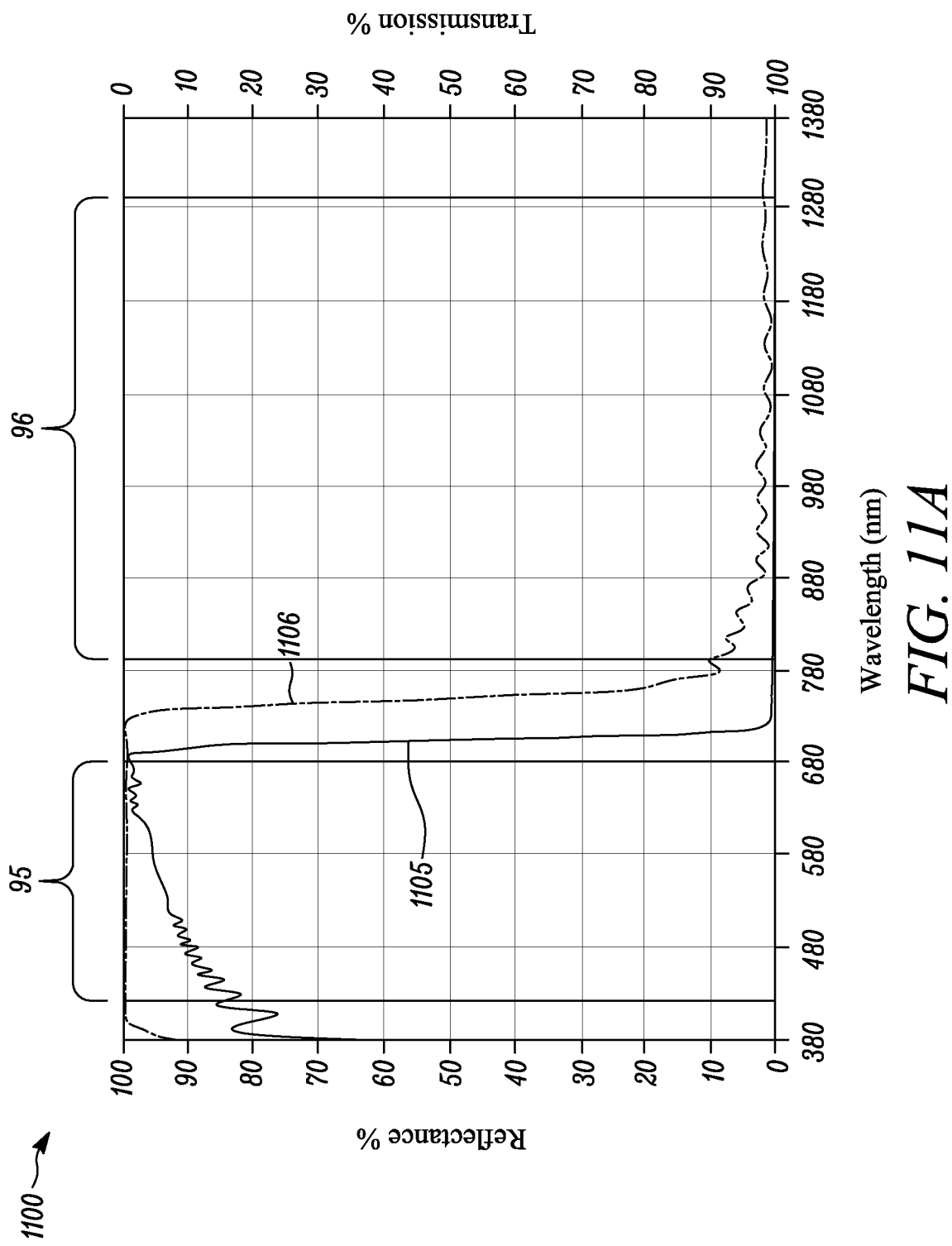
FIG. 11A illustrates another exemplary plot depicting optical reflectance versus wavelength of the sample A and the CMOF for a p-polarized incident light incident at the second incident angle.

FIG. 11A illustrates an exemplary plot 1100 of optical characteristics of the sample A and the CMOF. The plot 1100 includes a reflectance curve 1105 depicting optical reflectance versus wavelength of the sample A for the p-polarized light incident at the second incident angle of greater than about 45 degrees. Further, the plot 1100 includes a reflectance curve 1106 depicting optical reflectance versus wavelength of the CMOF for the p-polarized light incident at the second incident angle of greater than about 45 degrees. In this example, the p-polarized incident light may be incident on respective mirror-environment interfaces of the CMOF and the sample A. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 1105, for the p-polarized incident light propagating in the incident plane 22 that includes the first direction, and for the second incident angle of greater than about 45 degrees, the plurality of alternating first and second polymeric layers of the sample A had an average optical reflectance of about 93% in the visible wavelength range 95, and an average optical transmission of about 99% in the infrared wavelength range 96.

As depicted by the reflectance curve 1106, for the p-polarized incident light propagating in the incident plane 22 that includes the first direction, and for the second incident angle of greater than about 45 degrees, the plurality of alternating first and second layers of the CMOF had an average optical reflectance of about 99% in the visible wavelength range 95, and an average optical transmission of about 99% in the infrared wavelength range 96.

Figure 11B:
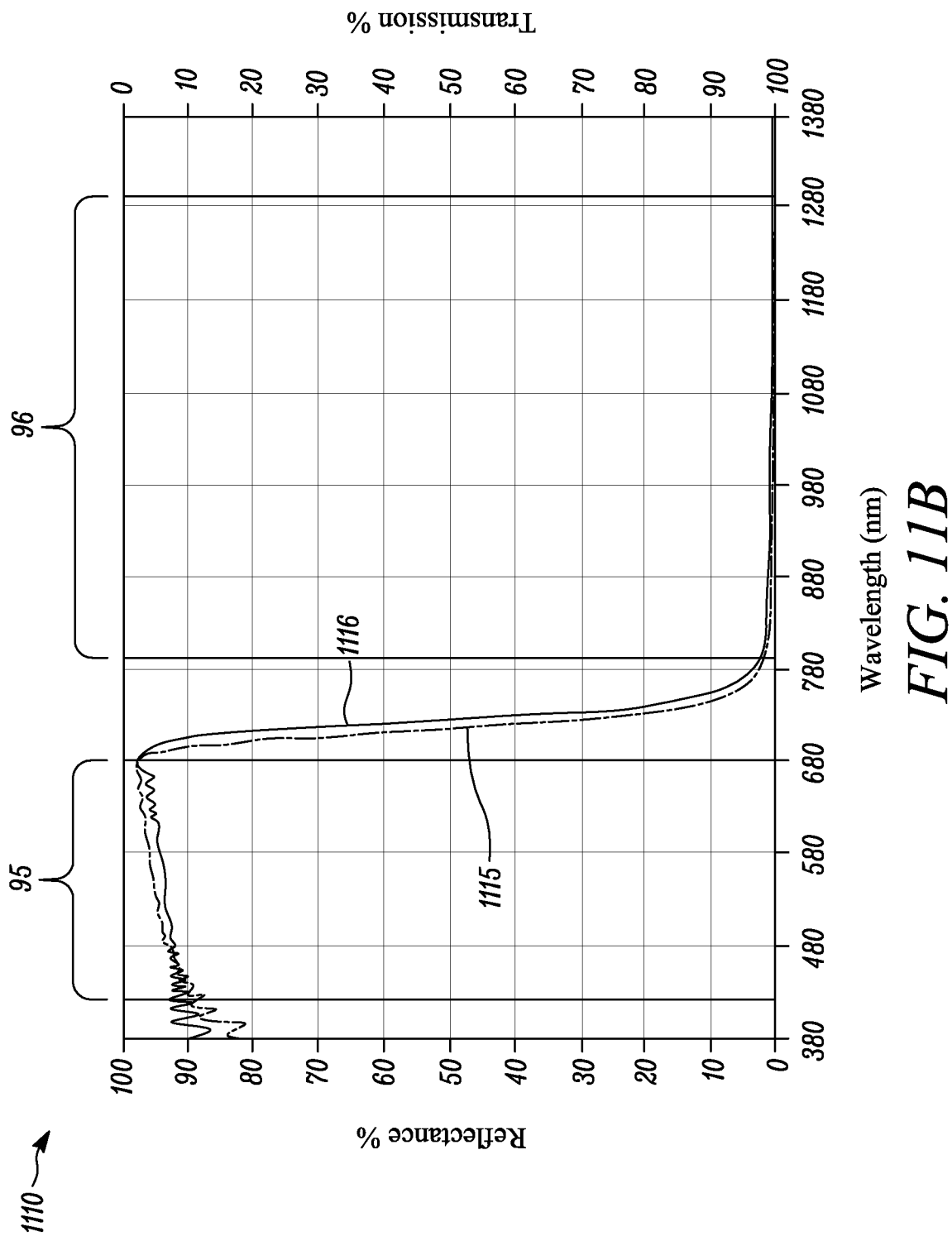
FIG. 11B illustrates another exemplary plot depicting optical reflectance versus wavelength of the samples B and C for an p-polarized incident light incident at the second incident angle.

FIG. 11B illustrates an exemplary plot 1110 of optical characteristics of the samples B and C. The plot 1110 includes reflectance curves 1115, 1116 depicts depicting optical reflectance versus wavelength of the samples B and C, respectively, for the p-polarized light incident at the second incident angle of greater than about 45 degrees. In this example, the p-polarized incident light may be incident on respective mirror-environment interfaces of the samples B and C. Wavelength is expressed in nanometers (nm) in the abscissa. Optical reflectance is expressed as a reflectance percentage in the left ordinate axis. Optical transmission is expressed as a transmission percentage on the right ordinate axis. Transmission percentage is approximated to be complementary to the reflectance percentage, i.e., transmission percentage=(100−reflectance percentage).

As depicted by the reflectance curve 1115, for the p-polarized incident light propagating in the incident plane 22 (shown in FIG. 3B) that includes the first direction, and for the second incident angle of greater than about 45 degrees, the plurality of alternating first and second polymeric layers of the sample B had an average optical reflectance of about 95% in the visible wavelength range 95, and an average optical transmission of about 99% in the infrared wavelength range 96.

As depicted by the reflectance curve 1116, for the p-polarized incident light propagating in the incident plane 22 that includes the first direction, and for the second incident angle of greater than about 45 degrees, the plurality of alternating first and second polymeric layers of the sample C had an average optical reflectance of about 94% in the visible wavelength range 95, and an average optical transmission of greater than about 99% in the infrared wavelength range 96.

As is apparent from FIGS. 8A-11B, for the visible wavelength range, and for both the s-polarized light and p-polarized light, the samples A, B, C had a higher average optical reflectance for light incident at the second incident angle of greater than about 45 degrees (i.e., an off-axis light) than for light incident at the first incident angle of less than about 10 degrees (i.e., substantially normally incident light or on-axis light). In other words, for the visible wavelength range, and each of the s-polarized light and the p-polarized light, the samples A, B, C had a greater optical transmittance for the on-axis light than for the off-axis light. Since, for the visible wavelength range, the samples A, B, C substantially collimated the off-axis light for both the s-polarized light and the p-polarized light, the samples A, B, C provided an improved collimation than the CMOF that substantially reflected the on-axis p-polarized light. Therefore, for the visible wavelength range, the samples A, B, C had less average optical reflectance for the on-axis light as compared to the CMOF. Optical reflectance for the on-axis light is generally not desirable as it may lower the on-axis luminance. Thus, for the visible wavelength range, less average optical reflectance for the on-axis light improved an axial luminance provided by the samples A, B, C.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A multilayer partial mirror comprising a plurality of alternating first and second polymeric layers numbering at least 50 in total and disposed between, and integrally formed with, opposing first and second polymeric skin layers, each of the first and second polymeric layers having an average thickness of less than about 500 nm, each of the polymeric skin layers having an average thickness of greater than about 0.5 microns, the first and second polymeric layers comprising respective indices nx1 and nx2 along a same in-plane x-direction, respective indices ny1 and ny2 along an in-plane y-direction orthogonal to the x-direction, and respective indices nz1 and nz2 along a z-direction of the polymeric layers orthogonal to the x- and y-directions, such that for at least one wavelength in a visible wavelength range extending from about 420 nm to about 680 nm:

nx1 and ny1 are within about 0.05 of each other;

nz1 is less than each of nx1 and nx2 by at least 0.06;

nx2, ny2 and nz2 are within about 0.05 of each other; and for each of the first and second polymeric skin layers, corresponding indices of the polymeric skin layer and one of the first polymeric layers and the second polymeric layers along each of the x-, y- and z-directions are within about 0.05 of each other;

wherein, for the visible wavelength range and an incident light propagating in an incident plane that comprises the x-direction:

for an s-polarized incident light, the plurality of alternating first and second polymeric layers has an average reflectance Rs1 for a first incident angle of less than about 10 degrees, and an average reflectance Rs2 for a second incident angle of greater than about 45 degrees; and for a p-polarized incident light, the plurality of alternating first and second polymeric layers has an average reflectance Rp1 for the first incident angle, and an average reflectance Rp2 for the second incident angle, each of Rs2/Rs1 and Rp2/Rp1 greater than about 1.15.

2. The multilayer partial mirror of claim 1, wherein for each of the first and second polymeric skin layers, corresponding indices of the polymeric skin layer and the first polymeric layers along each of the x-, y- and z-directions are within about 0.05 of each other.

3. The multilayer partial mirror of claim 1, wherein the second polymeric layers and at least one of the first and second polymeric skin layers comprise substantially a same material composition.

4. The multilayer partial mirror of claim 1, wherein:

a difference between a maximum thickness and a minimum thickness of the alternating first and second polymeric layers is between about 45% and about 65%; and a maximum difference between thicknesses of adjacent polymeric layers in the alternating first and second polymeric layers is less than about 25%.

5. The multilayer partial mirror of claim 1, wherein Rp2 is less than about 98% and greater than about 70%.

6. The multilayer partial mirror of claim 1, wherein Rp1 and Rs1 are within 10% of each other.

7. The multilayer partial mirror of claim 1, wherein for an infrared wavelength range from about 800 nm to about 1300, for the s-polarized incident light propagating in the incident plane that comprises the x-direction, and the first incident angle, the plurality of alternating first and second polymeric layers has an average transmission Ts1 that is greater than about 50%.

8. The multilayer partial mirror of claim 1, wherein for an infrared wavelength range from about 800 nm to about 1300, for the s-polarized incident light propagating in the incident plane that comprises the x-direction, and the second incident angle, the plurality of alternating first and second polymeric layers has an average transmission Ts2 that is greater than about 40%.

9. The multilayer partial mirror of claim 1, wherein for an infrared wavelength range from about 800 nm to about 1300, for the p-polarized incident light propagating in the incident plane that comprises the x-direction, and the first incident angle, the plurality of alternating first and second polymeric layers has an average transmission Tp1 that is greater than about 50%.

10. The multilayer partial mirror of claim 1, wherein for an infrared wavelength range from about 800 nm to about 1300, for the p-polarized incident light propagating in the incident plane that comprises the x-direction, and the second incident angle, the plurality of alternating first and second polymeric layers has an average transmission Tp2 that is greater than about 70%.

11. A backlight for providing illumination to a display panel configured to form an image, the backlight comprising:
an extended light source configured to emit a light through an emission surface thereof and comprising a back reflector; and
the multilayer partial mirror of claim 1 disposed on the emission surface and configured to receive the emitted light and transmit a portion of the received light therethrough, the multilayer partial mirror and the back reflector forming a recycling optical cavity therebetween.

12. The multilayer partial mirror of claim 1, wherein when an optical system is formed by:
providing a substantially Lambertian light source that comprises a back reflector and emits substantially unpolarized light through an extended emission surface thereof, the back reflector having a total reflectance of greater than about 90% at least one wavelength in the visible wavelength range; and
disposing the multilayer partial mirror of claim 1 between a reflective polarizer and the emission surface, such that for the visible wavelength range and a substantially normally incident light, the reflective polarizer has an average optical reflectance of greater than about 60% when the incident light is polarized along the x-direction and an average optical transmittance of greater than about 60% when the incident light is polarized along the y-direction;
then, a luminous distribution of light exiting the optical system through the reflective polarizer comprises at least one global peak at an angle of greater than about 5 degrees with a line normal to the reflective polarizer.

13. The multilayer partial mirror of claim 12, wherein the at least one global peak lies in a plane that makes an oblique angle with the x-direction.

14. A multilayer partial mirror comprising a plurality of alternating first and second polymeric layers numbering at least 50 in total, each of the first and second polymeric layers having an average thickness of less than about 500 nm, the first and second polymeric layers comprising respective indices nx1 and nx2 along a same in-plane x-direction, respective indices ny1 and ny2 along an in-plane y-direction orthogonal to the x-direction, and respective indices nz1 and nz2 along a z-direction of the polymeric layers orthogonal to the x- and y-directions, such that for at least one wavelength in a visible wavelength range extending from about 420 nm to about 680 nm:
nz1 is less than each of nx1 and nx2 by at least 0.06;
a magnitude of a difference between nx2 and ((nx1+nz1)/2) is less than about 0.05; and
nx2, ny2 and nz2 are within about 0.05 of each other;
wherein, for the visible wavelength range, an infrared wavelength range from about 800 nm to about 1300, and an incident light propagating in an incident plane that comprises the x-direction:
for a first incident angle of less than about 10 degrees, the plurality of alternating first and second polymeric layers has an average reflectance Rp1 for the incident light polarized along the x-direction and an average reflectance Rs1 for the incident light polarized along the y-direction, each of Rp1 and Rs1 less than about 85% for the visible wavelength range and less than about 50% for the infrared wavelength range; and
for a second incident angle of greater than about 45 degrees, the plurality of alternating first and second polymeric layers has average reflectances Rp2 and Rs2 for respective p- and s-polarized incident lights, each of Rp2 and Rs2 greater than about 70% for the visible wavelength range.

15. The multilayer partial mirror of claim 14, wherein $1.6<nx1<1.76$, $1.6<ny1<1.76$, and $1.5<nz1<1.55$.

16. The multilayer partial mirror of claim 14, wherein $1.55<nx2<1.75$, $1.55<ny2<1.75$, and $1.6<nz2<1.7$.

17. A multilayer partial mirror comprising a plurality of alternating first and second polymeric layers numbering between about 50 and about 600 in total and disposed between integrally formed opposing first and second polymeric skin layers, each polymeric layer disposed between the first and second polymeric skin layers having an average thickness of less than about 500 nm, such that for at least one wavelength in a visible wavelength range extending from about 420 nm to about 680 nm:
each of the first and second polymeric layers has an in-plane birefringence of less than about 0.05;
the first polymeric layers have an out-of-plane birefringence of greater than about 0.06; and
the second polymeric layers have an out-of-plane birefringence of less than about 0.02;
wherein, for the visible wavelength range and an incident light propagating in an incident plane that comprises a same in-plane first direction and at a first incident angle of less than about 10 degrees, the multilayer partial mirror has an average reflectance Rs1 for the incident light being s-polarized and an average reflectance Rp1 for the incident light being p-polarized, Rp1/Rs1 between about 0.8 and about 1.2; and
wherein, an optical reflectance of the multilayer partial mirror versus wavelength for the first incident angle and for each of the p- and s-polarized incident lights, comprises a reflection band edge between about 760 nm and about 980 nm.

* * * * *